United States Patent
Cha et al.

(10) Patent No.: US 9,363,504 B2
(45) Date of Patent: Jun. 7, 2016

(54) APPARATUS AND METHOD FOR DISPLAYING 3-DIMENSIONAL IMAGE

(75) Inventors: Youngwoon Cha, Paju-si (KR); Kyoungil Lee, Seongnam-Si (KR); Dongha Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 491 days.

(21) Appl. No.: 13/476,707

(22) Filed: May 21, 2012

(65) Prior Publication Data

US 2012/0327073 A1 Dec. 27, 2012

(30) Foreign Application Priority Data

Jun. 23, 2011 (KR) .................. 10-2011-0061371
Aug. 5, 2011 (KR) .................. 10-2011-0078279

(51) Int. Cl.
*G06T 15/00* (2011.01)
*H04N 13/04* (2006.01)

(52) U.S. Cl.
CPC ....... *H04N 13/0415* (2013.01); *H04N 13/0404* (2013.01); *H04N 13/0409* (2013.01)

(58) Field of Classification Search
CPC ....... G06T 15/506; G06T 15/50; G06T 15/80; G06T 15/60; G06T 15/06; H04N 13/0404; H04N 13/0409; H04N 13/0415; H04N 13/0044
See application file for complete search history.

(56) References Cited

U.S. PATENT DOCUMENTS

| | | | | |
|---|---|---|---|---|
| 5,543,965 A | * | 8/1996 | Bielinski | G02B 27/2214 348/E13.029 |
| 5,933,127 A | * | 8/1999 | DuBois | G09G 3/003 345/87 |
| 5,949,390 A | * | 9/1999 | Nomura | G02B 27/2214 345/32 |
| 6,057,878 A | * | 5/2000 | Ogiwara | G02B 26/0833 348/51 |
| 6,094,216 A | * | 7/2000 | Taniguchi | G09G 3/003 348/51 |
| 6,271,896 B2 | * | 8/2001 | Moseley et al. | 349/15 |
| 7,190,518 B1 | * | 3/2007 | Kleinberger et al. | 359/465 |
| 7,787,008 B2 | * | 8/2010 | Fukushima | G02B 27/2214 348/51 |
| 7,944,464 B2 | * | 5/2011 | Fukushima et al. | 348/51 |
| 8,063,931 B2 | * | 11/2011 | Saishu | G02B 27/2214 345/55 |

(Continued)

FOREIGN PATENT DOCUMENTS

CN 2603418 Y 2/2004
CN 1860800 A 11/2006

(Continued)

OTHER PUBLICATIONS

U.S. Office Action for U.S. Appl. No. 13/307,156 dated Nov. 26, 2013.

(Continued)

*Primary Examiner* — Phi Hoang
*Assistant Examiner* — Charles L Beard
(74) *Attorney, Agent, or Firm* — Ked & Associates, LLP

(57) ABSTRACT

An apparatus and method for displaying a three-dimensional (3D) image is disclosed. On a display panel, red, green and blue subpixels are alternately arranged in a row direction and subpixels having the same color are arranged in a column direction. A 3D image filter is disposed ahead of the display panel and includes a transparent area and a non-transparent area arranged alternately. An edge defining the width of the non-transparent area is inclined with respect to a vertical axis of the display panel. A controller assigns a view image to be displayed at a subpixel of the display panel according to an inclination angle of the edge.

25 Claims, 22 Drawing Sheets

(56) References Cited

U.S. PATENT DOCUMENTS

| | | | | |
|---|---|---|---|---|
| 8,130,272 B2* | 3/2012 | Pastoor | G09G 3/003 | 348/169 |
| 8,233,036 B2* | 7/2012 | Park | H04N 13/0404 | 345/419 |
| 8,254,026 B2* | 8/2012 | Hong | H04N 13/0404 | 348/59 |
| 8,345,088 B2* | 1/2013 | Harrold | H04N 13/0404 | 348/290 |
| 8,410,996 B2* | 4/2013 | Lee et al. | | 345/6 |
| 8,493,439 B2* | 7/2013 | Park | G02B 27/2214 | 345/419 |
| 8,537,292 B2* | 9/2013 | Lin | | 349/15 |
| 8,553,030 B2* | 10/2013 | Chen et al. | | 345/419 |
| 8,582,062 B2* | 11/2013 | Kim | G02B 27/2214 | 349/122 |
| 8,614,772 B2* | 12/2013 | Lin | | 349/15 |
| 8,614,774 B2* | 12/2013 | Uehara et al. | | 349/57 |
| 8,760,761 B2* | 6/2014 | Uehara | | 359/464 |
| 8,773,517 B2* | 7/2014 | Niioka et al. | | 348/54 |
| 8,902,300 B2* | 12/2014 | Saito | G03B 35/18 | 348/51 |
| 2001/0019479 A1 | 9/2001 | Nakabayashi et al. | | |
| 2003/0007204 A1* | 1/2003 | Ashizaki | G03H 1/268 | 359/23 |
| 2003/0048354 A1* | 3/2003 | Takemoto | H04N 13/0048 | 348/51 |
| 2003/0067539 A1* | 4/2003 | Doerfel | G02B 6/0043 | 348/51 |
| 2003/0161040 A1* | 8/2003 | Ishii | G02B 27/2214 | 359/463 |
| 2003/0210537 A1 | 11/2003 | Engelmann | | 362/26 |
| 2004/0207605 A1 | 10/2004 | Mackey et al. | | 345/173 |
| 2004/0245440 A1* | 12/2004 | Klippstein et al. | | 250/226 |
| 2005/0105179 A1* | 5/2005 | Taira | H04N 13/0404 | 359/463 |
| 2005/0225502 A1* | 10/2005 | Nam et al. | | 345/55 |
| 2005/0259323 A1* | 11/2005 | Fukushima | G02B 27/2214 | 359/462 |
| 2005/0285997 A1* | 12/2005 | Koyama et al. | | 349/117 |
| 2006/0082520 A1* | 4/2006 | Otte | | 345/32 |
| 2006/0114415 A1* | 6/2006 | Shestak et al. | | 353/7 |
| 2006/0125916 A1* | 6/2006 | Mashitani | G02B 27/2214 | 348/51 |
| 2006/0132458 A1 | 6/2006 | Garfio et al. | | 345/173 |
| 2006/0139448 A1* | 6/2006 | Ha et al. | | 348/51 |
| 2006/0146208 A1* | 7/2006 | Kim | | 349/15 |
| 2006/0170616 A1* | 8/2006 | Hirayama et al. | | 345/32 |
| 2006/0268185 A1 | 11/2006 | Hamagishi et al. | | |
| 2006/0279554 A1 | 12/2006 | Shin et al. | | |
| 2006/0279580 A1* | 12/2006 | Akka et al. | | 345/582 |
| 2006/0285206 A1* | 12/2006 | Tzschoppe | | 359/465 |
| 2006/0290685 A1 | 12/2006 | Nagakubo | | 345/175 |
| 2007/0003134 A1* | 1/2007 | Song et al. | | 382/154 |
| 2007/0058113 A1* | 3/2007 | Wu et al. | | 349/106 |
| 2007/0058127 A1* | 3/2007 | Mather et al. | | 349/159 |
| 2007/0058258 A1* | 3/2007 | Mather et al. | | 359/619 |
| 2007/0121076 A1* | 5/2007 | Klippstein et al. | | 353/30 |
| 2007/0139615 A1* | 6/2007 | Tzschoppe et al. | | 352/57 |
| 2007/0152983 A1* | 7/2007 | McKillop et al. | | 345/173 |
| 2007/0236959 A1 | 10/2007 | Tolbert et al. | | 362/616 |
| 2008/0165296 A1* | 7/2008 | Kim et al. | | 349/15 |
| 2008/0186736 A1 | 8/2008 | Rinko | | 362/615 |
| 2008/0191964 A1* | 8/2008 | Spengler | | 345/6 |
| 2008/0211734 A1* | 9/2008 | Huitema et al. | | 345/3.1 |
| 2008/0231767 A1* | 9/2008 | Lee | | 349/15 |
| 2008/0231952 A1* | 9/2008 | Kim | | 359/465 |
| 2008/0239482 A1* | 10/2008 | Fukushima | G02B 27/2214 | 359/463 |
| 2008/0259233 A1* | 10/2008 | Krijn et al. | | 349/15 |
| 2008/0266525 A1* | 10/2008 | Relke et al. | | 353/8 |
| 2008/0291126 A1* | 11/2008 | Hamagishi | | 345/55 |
| 2008/0291500 A1* | 11/2008 | Asai | H04N 1/4051 | 358/3.06 |
| 2008/0316597 A1* | 12/2008 | Tsai et al. | | 359/465 |
| 2009/0002262 A1* | 1/2009 | Fukushima et al. | | 345/1.1 |
| 2009/0073556 A1* | 3/2009 | Bent-Gourley | G02B 27/2214 | 359/463 |
| 2009/0079733 A1* | 3/2009 | Fukushima et al. | | 345/419 |
| 2009/0102916 A1* | 4/2009 | Saishu | H04N 13/0048 | 348/54 |
| 2009/0128547 A1 | 5/2009 | Park | | |
| 2009/0128900 A1* | 5/2009 | Grasnick | | 359/462 |
| 2009/0174673 A1 | 7/2009 | Ciesla | | |
| 2009/0190096 A1* | 7/2009 | Chen | G02B 27/2214 | 353/7 |
| 2009/0195642 A1* | 8/2009 | Fukushima | H04N 13/0404 | 348/51 |
| 2009/0225244 A1* | 9/2009 | Wang et al. | | 349/15 |
| 2009/0244387 A1* | 10/2009 | Lee et al. | | 348/674 |
| 2009/0278936 A1* | 11/2009 | Pastoor et al. | | 348/169 |
| 2009/0315883 A1* | 12/2009 | King | | 345/419 |
| 2010/0033813 A1* | 2/2010 | Rogoff | G02B 27/2214 | 359/463 |
| 2010/0046069 A1* | 2/2010 | Otte | H04N 13/0409 | 359/462 |
| 2010/0073768 A1* | 3/2010 | Kim et al. | | 359/463 |
| 2010/0091205 A1* | 4/2010 | Wu et al. | | 349/15 |
| 2010/0118045 A1* | 5/2010 | Brown Elliott | G02B 27/2214 | 345/589 |
| 2010/0118403 A1 | 5/2010 | Laitinen et al. | | 359/567 |
| 2010/0137033 A1 | 6/2010 | Lee | | 455/566 |
| 2010/0156508 A1 | 6/2010 | Yato | | 327/517 |
| 2010/0171811 A1* | 7/2010 | Kamins-Naske et al. | | 348/40 |
| 2010/0182408 A1* | 7/2010 | Liu | | 348/51 |
| 2010/0238275 A1* | 9/2010 | Otte et al. | | 348/54 |
| 2010/0245289 A1 | 9/2010 | Svjada | | 345/175 |
| 2010/0254158 A1 | 10/2010 | Harton et al. | | 362/607 |
| 2010/0302799 A1 | 12/2010 | Rosberg et al. | | |
| 2010/0309204 A1* | 12/2010 | Smith et al. | G02B 27/2214 | 345/419 |
| 2010/0309296 A1* | 12/2010 | Harrold | H04N 13/0404 | 348/54 |
| 2010/0315324 A1* | 12/2010 | Nam et al. | | 345/102 |
| 2010/0315492 A1* | 12/2010 | Baik et al. | H04N 5/23219 | 348/51 |
| 2011/0038043 A1 | 2/2011 | Lin et al. | | |
| 2011/0043615 A1* | 2/2011 | Saishu et al. | | 348/51 |
| 2011/0102423 A1* | 5/2011 | Nam | H04N 13/0404 | 345/419 |
| 2011/0117958 A1* | 5/2011 | Kim et al. | | 455/556.1 |
| 2011/0157171 A1 | 6/2011 | Lin | | |
| 2011/0157471 A1* | 6/2011 | Seshadri et al. | | 348/564 |
| 2011/0157696 A1* | 6/2011 | Bennett et al. | | 359/462 |
| 2011/0157697 A1* | 6/2011 | Bennett et al. | | 359/462 |
| 2011/0169919 A1* | 7/2011 | Karaoguz et al. | | 348/46 |
| 2011/0181706 A1 | 7/2011 | Harrold et al. | | |
| 2011/0221655 A1 | 9/2011 | Fukui | | |
| 2011/0224929 A1 | 9/2011 | Lin | | |
| 2011/0242441 A1* | 10/2011 | Minami | G02B 5/0215 | 349/15 |
| 2011/0265002 A1 | 10/2011 | Hong et al. | | |
| 2011/0285698 A1* | 11/2011 | Tzschoppe | H04N 13/0409 | 345/419 |
| 2011/0304707 A1* | 12/2011 | Oyagi | | 348/51 |
| 2011/0304716 A1 | 12/2011 | Sato et al. | | |
| 2011/0316985 A1* | 12/2011 | Ishikawa | G02B 27/2214 | 348/51 |
| 2011/0316987 A1* | 12/2011 | Komoriya | G06K 9/00228 | 348/51 |
| 2011/0317129 A1* | 12/2011 | Hsu et al. | | 353/8 |
| 2012/0032913 A1* | 2/2012 | Shih et al. | | 345/174 |
| 2012/0033058 A1* | 2/2012 | Yamauchi | H04N 13/0404 | 348/54 |
| 2012/0038632 A1* | 2/2012 | Matsunaga | G02B 27/2214 | 345/419 |
| 2012/0038634 A1 | 2/2012 | Cha et al. | | |
| 2012/0044330 A1* | 2/2012 | Watanabe | G02B 27/2214 | 348/54 |
| 2012/0047453 A1 | 2/2012 | Hale et al. | | |
| 2012/0062990 A1* | 3/2012 | Okamoto | | 359/463 |
| 2012/0062991 A1* | 3/2012 | Krijn | H04N 13/0404 | 359/463 |
| 2012/0063169 A1 | 3/2012 | Ahed et al. | | 362/611 |
| 2012/0075698 A1* | 3/2012 | Minami | G02B 6/0043 | |

(56) References Cited

U.S. PATENT DOCUMENTS

| | | | |
|---|---|---|---|
| 2012/0081776 A1* | 4/2012 | Yeh et al. | 359/462 359/273 |
| 2012/0086708 A1* | 4/2012 | Lin | G09G 3/003 345/419 |
| 2012/0092337 A1 | 4/2012 | Tsao | |
| 2012/0092763 A1 | 4/2012 | Song | |
| 2012/0098827 A1* | 4/2012 | Yoshifuji et al. | 345/419 |
| 2012/0105954 A1* | 5/2012 | Prouty, IV | 359/462 |
| 2012/0120213 A1* | 5/2012 | Ohyama | H04N 13/0415 348/60 |
| 2012/0162761 A1* | 6/2012 | Grasnick et al. | 359/462 |
| 2012/0182407 A1* | 7/2012 | Yoshida | G02B 27/2214 348/54 |
| 2012/0274630 A1* | 11/2012 | Lin | H04N 13/0409 345/419 |
| 2012/0314937 A1* | 12/2012 | Kim | H04N 13/0033 382/154 |
| 2012/0327073 A1* | 12/2012 | Cha | H04N 13/0404 345/419 |
| 2012/0327074 A1* | 12/2012 | Lee | H04N 13/0404 345/419 |
| 2013/0003128 A1* | 1/2013 | Watanabe | G03B 35/08 358/1.15 |
| 2013/0135720 A1* | 5/2013 | Naske et al. | H04N 13/0011 359/464 |
| 2013/0147804 A1* | 6/2013 | Naske | H04N 13/0011 345/426 |
| 2013/0169878 A1* | 7/2013 | Kim | H04N 13/0438 348/569 |
| 2013/0187910 A1* | 7/2013 | Raymond | G09G 5/14 345/419 |
| 2013/0242067 A1* | 9/2013 | Jeong | H04N 13/0402 348/54 |
| 2014/0139651 A1* | 5/2014 | Jiang | G02B 27/2214 348/52 |

FOREIGN PATENT DOCUMENTS

| | | |
|---|---|---|
| CN | 1949886 A | 4/2007 |
| CN | 201117490 Y | 9/2008 |
| CN | 101361016 A | 2/2009 |
| CN | 101742343 A | 6/2010 |
| CN | 101751176 A | 6/2010 |
| CN | 101971237 A | 2/2011 |
| CN | 102004324 A | 4/2011 |
| CN | 102056003 A | 5/2011 |
| EP | 0 791 847 A1 | 8/1997 |
| EP | 1 273 851 A2 | 1/2003 |
| EP | 2 136 225 A1 | 12/2009 |
| JP | 2008-058790 A | 3/2008 |
| KR | 10-2008-0044626 A | 5/2008 |
| WO | WO 2010/025139 A2 | 3/2010 |
| WO | WO 2010/103860 A2 | 9/2010 |

OTHER PUBLICATIONS

U.S. Office Action for U.S. Appl. No. 13/307,206 dated Nov. 26, 2013.
Chinese Office Action dated Apr. 30, 2014 issued in foreign Applicaton No. 201210209626.4.
Office Action dated Aug. 1, 2013 for co-pending U.S. Appl. No. 13/307,156.
Office Action dated Aug. 1, 2013 for co-pending U.S. Appl. No. 13/307,206.
Chinese Office Action dated Mar. 31, 2014, on Chinese Patent Application No. 201110462139.4.
Chinese Office Action issued in related foreign application No. 201110462514.5 dated Jun. 4, 2014.
Office Action dated Nov. 7, 2014, issued in U.S. Appl. No. 13/307,206.
Office Action issued in co-pending U.S. Appl. No. 13/307,206 dated Nov. 7, 2014.
Office Action issued in co-pending U.S. Appl. No. 13/307,156 date Nov. 24, 2014.
U.S. Office Action issued in U.S. Appl. No. 13/307,156 dated Mar. 20, 2015.
U.S. Office Action issued in U.S. Appl. No. 13/476,724 dated Mar. 25, 2015.
U.S. Final Office Action issued in co-pending U.S. Appl. No. 13/476,724 dated Aug. 31, 2015.
European Search Report dated Feb. 13, 2014, issued in Application No. 11 00 9465.
European Search Report dated Feb. 13, 2014, issued in Application No. 11 00 9466.
Chinese Office Action and Search Report dated Mar. 21, 2014, issued in Application No. 201210210695.7.
United States Office Action dated Apr. 22, 2014, issued in U.S. Appl. No. 13/307,156.
United States Office Action dated Apr. 22, 2014, issued in U.S. Appl. No. 13/307,206.
Chinese Office Action issued in application No. 201210209626.4 dated Feb. 1, 2016 (full Chinese text and English language translation).

* cited by examiner

<off>

<on>

APPARATUS AND METHOD FOR DISPLAYING 3-DIMENSIONAL IMAGE

CROSS-REFERENCE TO RELATED APPLICATION(S)

This application claims priority from Korean Patent Application No. 10-2011-0061371, filed Jun. 23, 2011 and Korean Patent Application No. 10-2011-0078279, filed Aug. 5, 2011, which are hereby incorporated by reference as if fully set forth herein.

BACKGROUND OF THE INVENTION

1. Field of the Invention

The present invention relates to an apparatus and method for displaying a three-dimensional (3D) image, and more particularly, to an apparatus and method for displaying a 3D image, which is able to display a 2-view or multi-view image.

2. Discussion of the Related Art

Analog broadcast environments have been rapidly transitioned to digital broadcast environments. Thus, the amount of content for digital broadcasts has been considerably increased. In addition, as content for digital broadcasts, content for displaying a three-dimensional (3D) image signal as a 3D image has been produced in addition to content for displaying a 2-dimensional (2D) image signal as a 2D image.

A technique of displaying a 3D image uses the principle of binocular disparity so as to enable a viewer to perceive a 3D effect and includes a shutter glasses method, a non-glasses method, and a full-3D method.

SUMMARY OF THE INVENTION

Accordingly, the present invention is directed to an apparatus and method for displaying a 3-dimensional (3D) image that substantially obviate one or more problems due to limitations and disadvantages of the related art.

An object of the present invention is to provide an apparatus and method for displaying a 3D image, which is able to prevent a moiré phenomenon generated while displaying the 3D image.

Another object of the present invention is to provide an apparatus and method for displaying a 3D image, which is able to improve crosstalk due to viewer motion while viewing the 3D image and improve resolution of the 3D image.

Another object of the present invention is to provide an apparatus and method for displaying a 3D image, which is able to display both a 2-dimensional (2D) image and the 3D image.

Another object of the present invention is to provide an apparatus and method for displaying a 3D image, which is able to provide a wide sweet spot so as to enlarge a viewing angle of a viewer and remarkably reduce crosstalk and flipping generated while the viewer moves.

Another object of the present invention is to provide an apparatus and method for displaying a 3D image, which is able to prevent crosstalk and flipping from being generated due to viewer motion while viewing a 3D image.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for displaying a three-dimensional (3D) image includes a display panel on which red, green and blue subpixels are alternately arranged in a row direction and subpixels having the same color are arranged in a column direction, a 3D image filter disposed ahead of the display panel and including a transparent area and a non-transparent area arranged alternately, an edge defining the width of the non-transparent area being inclined with respect to a vertical axis of the display panel, and a controller configured to assign a view image to be displayed at a subpixel of the display panel according to an inclination angle of the edge.

The 3D image filter may be formed such that the width of the non-transparent area corresponds to the total width of four subpixels.

The 3D image filter may be formed such that the width of the transparent area corresponds to the width of one subpixel.

In the 3D image filter, the edge of the non-transparent area may be formed to pass through a point spaced apart from a start point by the width of the non-transparent area in the row direction and spaced apart from the start point by the total length of a predetermined number of subpixels in the column direction.

An inclination angle α of the edge may be arctan(4Ph/3Pv), Ph may denote the width of the subpixel and Pv may denote the length of the subpixel.

If the edge is inclined to the right with respect to the vertical axis of the display panel, as a view image to be displayed at a subpixel, the controller assigns a view image having an allocation number greater than that of a view image of a previous subpixel in the row direction by a first number and assigns a view image having an allocation number having a difference between the allocation number of the view image, which is greater than that of the view image of the previous subpixel by the first number, and a maximum allocation number if the view image having the allocation number greater than that of the view image of the previous subpixel by the first number is not present, and assigns a view image having an allocation number greater than that of a view image of a previous subpixel in the column direction by a second number and assigns a view image having an allocation number having a difference between the allocation number of the view image, which is greater than that of the view image of the previous subpixel by the second number, and a maximum allocation number if the view image having the allocation number greater than that of the view image of the previous subpixel by the second number is not present.

If the edge is inclined to the left with respect to the vertical axis of the display panel, as a view image to be displayed at a subpixel, the controller assigns a view image having an allocation number less than that of a view image of a previous subpixel in the row direction by a first number and assigns a view image having an allocation number having a sum of the allocation number of the view image, which is less than that of the view image of the previous subpixel by the first number, and a maximum allocation number if the view image having the allocation number less than that of the view image of the previous subpixel by the first number is not present, and assigns a view image having an allocation number greater than that of a view image of a previous subpixel in the column direction by a second number and assigns a view image having an allocation number having a difference between the allocation number of the view image, which is greater than that of the view image of the previous subpixel by the second number, and a maximum allocation number if the view image having the allocation number greater than that of the view image of the previous subpixel by the second number is not present.

The controller may further control activation and deactivation of the non-transparent area of the 3D image filter according to the kind of the displayed image.

The apparatus may further include a backlight arranged behind the display panel, for supplying light to the display panel.

The display panel may be a Plasma Display Panel (PDP) or a Liquid Crystal Display (LCD).

In another aspect of the present invention, an apparatus for displaying a three-dimensional (3D) image includes a display panel on which red, green and blue subpixels are alternately arranged in a row direction and subpixels having the same color are arranged in a column direction, a lenticular lens substrate arranged ahead of the display panel and including a plurality of lenses, a vertical axis of each of which is inclined with respect to a vertical axis of the display panel, and a controller configured to assign a view image to be displayed at a subpixel of the display panel according to an inclination angle of the vertical axis of the lens.

The width of the lens may correspond to the total width of 5 subpixels.

An inclination angle $\alpha$ of the vertical axis of the lens may be arctan(4Ph/3Pv), Ph may denote the width of the subpixel and Pv may denote the length of the subpixel.

If the vertical axis of the lens is inclined to the right with respect to the vertical axis of the display panel, as a view image to be displayed at a subpixel, the controller assigns a view image having an allocation number greater than that of a view image of a previous subpixel in the row direction by a first number and assigns a view image having an allocation number having a difference between the allocation number of the view image, which is greater than that of the view image of the previous subpixel by the first number, and a maximum allocation number if the view image having the allocation number greater than that of the view image of the previous subpixel by the first number is not present, and assigns a view image having an allocation number greater than that of a view image of a previous subpixel in the column direction by a second number and assigns a view image having an allocation number having a difference between the allocation number of the view image, which is greater than that of the view image of the previous subpixel by the second number, and a maximum allocation number if the view image having the allocation number greater than that of the view image of the previous subpixel by the second number is not present.

If the vertical axis of the lens is inclined to the left with respect to the vertical axis of the display panel, as a view image to be displayed at a subpixel, the controller assigns a view image having an allocation number less than that of a view image of a previous subpixel in the row direction by a first number and assigns a view image having an allocation number having a sum of the allocation number of the view image, which is less than that of the view image of the previous subpixel by the first number, and a maximum allocation number if the view image having the allocation number less than that of the view image of the previous subpixel by the first number is not present, and assigns a view image having an allocation number greater than that of a view image of a previous subpixel in the column direction by a second number and assigns a view image having an allocation number having a difference between the allocation number of the view image, which is greater than that of the view image of the previous subpixel by the second number, and a maximum allocation number if the view image having the allocation number greater than that of the view image of the previous subpixel by the second number is not present.

The lenticular lens substrate may further include a lenticular array configured to convert transmitted light into circularly polarized light, and the controller may further control activation and deactivation of the lenticular array according to the kind of the displayed image.

The apparatus may further include a backlight arranged behind the display panel, for supplying light to the display panel.

The display panel may be a Plasma Display Panel (PDP) or a Liquid Crystal Display (LCD).

In another aspect of the present invention, a method of displaying a three-dimensional (3D) image includes assigning view images to be displayed at subpixels of a display panel from among a plurality of view images according to an inclination angle of an edge defining the width of a non-transparent area, displaying the assigned view images through the subpixels of the display panel, and separating the displayed view images using a transparent area formed between non-transparent areas. The edge is inclined with respect to a vertical axis of the display panel, and, on the display panel, red, green and blue subpixels are alternately arranged in a row direction and subpixels having the same color are arranged in a column direction.

In another aspect of the present invention, a method of displaying a three-dimensional (3D) image includes assigning view images to be displayed at subpixels of a display panel from among a plurality of view images according to an inclination angle of a vertical axis of a lens, displaying the assigned view images through the subpixels of the display panel, and refracting the displayed view images using the lens. The vertical axis of the lens is inclined with respect to a vertical axis of the display panel, and, on the display panel, red, green and blue subpixels are alternately arranged in a row direction and subpixels having the same color are arranged in a column direction.

In another aspect of the present invention, an apparatus for displaying a three-dimensional (3D) image includes a display panel on which red, green and blue subpixels are alternately arranged in a row direction and subpixels having the same color are arranged in a column direction, a 3D image filter disposed ahead of the display panel and including a transparent area and a non-transparent area arranged alternately, and a controller configured to determine a view image to be displayed at each subpixel of the display panel to one of two view images based on numbers allocated to the subpixels of the display panel. The numbers are non-continuously allocated to neighboring subpixels. Turn of a number allocated to a subpixel and turn of a number allocated to a subpixel neighboring with the subpixel are non-continuously.

The apparatus may further include a memory configured to store information indicating the numbers allocated to the subpixels of the display panel.

The controller may calculate the numbers based on stored information and detected information. The detected information may be information indicating the positions of viewer's eyes. The detected information may be information indicating the position of a center point of both eyes of the viewer. The controller may calculate the numbers such that the center point of both eyes of the viewer matches a multi-view center point.

The numbers allocated to the subpixels of the display panel may be 15 values. Seven values of the 15 values may be associated with one of the two view images and the remaining eight values may be associated with the other of the two view images.

One of the two view images may be a left view image and the other of the two view images may be a right view image.

An edge defining the width of the non-transparent area may be inclined with respect to a vertical axis of the display panel. The numbers allocated to the subpixels of the display panel may be changed according to an inclination direction of the edge. An inclination angle α of the edge may be arctan(4Ph/3Pv). Here, Ph denotes the width of the subpixel and Pv denotes the length of the subpixel.

Each of the numbers of the subpixels of the display panel may be a number greater than a number allocated to a previous subpixel in the row direction by a first number or a difference between the number greater than the number allocated to the previous subpixel by the first number and a maximum number if the number greater than the number allocated to the previous subpixel by the first number is not present, and may be a number greater than a number allocated to a previous subpixel in the column direction by a second number or a difference between the number greater than the number allocated to the previous subpixel by the second number and the maximum number if the number greater than the number allocated to the previous subpixel by the second number is not present.

Each of the numbers of the subpixels of the display panel may be a number less than a number allocated to a previous subpixel in the row direction by a first number or a sum of the number less than the number allocated to the previous subpixel by the first number and a maximum number if the number less than the number allocated to the previous subpixel by the first number is not present, and may be a number greater than a number allocated to a previous subpixel in the column direction by a second number or a difference between the number greater than the number allocated to the previous subpixel by the second number and the maximum number if the number greater than the number allocated to the previous subpixel by the second number is not present.

The controller may further control activation and deactivation of the non-transparent area of the 3D image filter according to the kind of the displayed image.

In another aspect of the present invention, an apparatus for displaying a three-dimensional (3D) image includes a display panel on which red, green and blue subpixels are alternately arranged in a row direction and subpixels having the same color are arranged in a column direction, a lenticular lens substrate disposed ahead of the display panel and including a plurality of lenses, and a controller configured to determine a view image to be displayed at each subpixel of the display panel to one of two view images based on numbers allocated to the subpixels of the display panel. The numbers are non-continuously allocated to neighboring subpixels. Turn of a number allocated to a subpixel and turn of a number allocated to a subpixel neighboring with the subpixel are non-continuously.

The apparatus may further include a memory configured to store information indicating the numbers allocated to the subpixels of the display panel.

The controller may calculate the numbers based on stored information and detected information. The detected information may be information indicating the positions of viewer's eyes. The detected information may be information indicating the position of a center point of both eyes of the viewer. The controller may calculate the numbers such that the center point of both eyes of the viewer matches a multi-view center point.

The numbers allocated to the subpixels of the display panel may be 15 values. Seven values of the 15 values may be associated with one of the two view images and the remaining eight values may be associated with the other of the two view images.

One of the two view images may be a left view image and the other of the two view images may be a right view image.

Each of the numbers of the subpixels of the display panel may be a number greater than a number allocated to a previous subpixel in the row direction by a first number or a difference between the number greater than the number allocated to the previous subpixel by the first number and a maximum number if the number greater than the number allocated to the previous subpixel by the first number is not present, and may be a number greater than a number allocated to a previous subpixel in the column direction by a second number or a difference between the number greater than the number allocated to the previous subpixel by the second number and the maximum number if the number greater than the number allocated to the previous subpixel by the second number is not present.

Each of the numbers of the subpixels of the display panel may be a number less than a number allocated to a previous subpixel in the row direction by a first number or a sum of the number less than the number allocated to the previous subpixel by the first number and a maximum number if the number less than the number allocated to the previous subpixel by the first number is not present, and may be a number greater than a number allocated to a previous subpixel in the column direction by a second number or a difference between the number greater than the number allocated to the previous subpixel by the second number and the maximum number if the number greater than the number allocated to the previous subpixel by the second number is not present.

A vertical axis of the plurality of lenses may be inclined with respect to a vertical axis of the display panel. The numbers allocated to the subpixels of the display may be changed according to an inclination direction of the vertical axis of the lenses. An inclination angle α of the vertical axis of the lenses may be arctan(4Ph/3Pv). Here, Ph denotes the width of the subpixel and Pv denotes the length of the subpixel.

The lenticular lens substrate may further include a lenticular array configured to convert transmitted light into circularly polarized light, and the controller may further control activation and deactivation of the lenticular array according to the kind of the displayed image.

In another aspect of the present invention, a method of displaying a three-dimensional (3D) image includes determining a view image to be displayed at each subpixel of a display panel to one of two view images based on numbers allocated to the subpixels of the display panel, displaying the determined view images through the subpixels of the display panel, and separating the displayed view images using a transparent area formed between non-transparent areas. An edge defining the width of the non-transparent area is inclined with respect to a vertical axis of the display panel, and, on the display panel, red, green and blue subpixels are alternately arranged in a row direction, subpixels having the same color are arranged in a column direction, and the numbers are non-continuously allocated to neighboring subpixels. Turn of a number allocated to a subpixel and turn of a number allocated to a subpixel neighboring with the subpixel are non-continuously.

In another aspect of the present invention, a method of displaying a three-dimensional (3D) image includes determining a view image to be displayed at each subpixel of a display panel to one of two view images based on numbers allocated to the subpixels of the display panel, displaying the determined view images through the subpixels of the display panel, and refracting the displayed view images using a lens. A vertical axis of the lens is inclined with respect to a vertical axis of the display panel, and, on the display panel, red, green and blue subpixels are alternately arranged in a row direction, subpixels having the same color are arranged in a column direction, and the umbers are non-continuously allocated to neighboring subpixels. Turn of a number allocated to a subpixel and turn of a number allocated to a subpixel neighboring with the subpixel are non-continuously.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
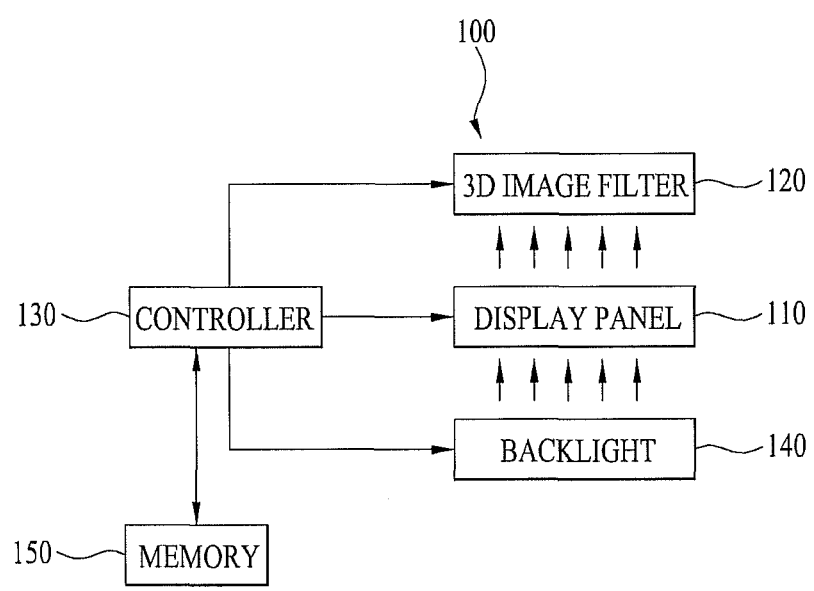
FIG. 1 is a block diagram showing the configuration of an apparatus for displaying a three-dimensional (3D) image according to an exemplary embodiment of the present invention.

Reference will now be made in detail to the preferred embodiments of the present invention, examples of which are illustrated in the accompanying drawings. The configuration and action of the present invention shown in the drawings and described with reference to the drawings will be described as at least one embodiment; however, the technical idea and the core configuration and action of the present invention are not limited thereto.

In addition, although the terms used in the present invention are selected from generally known and used terms, some of the terms mentioned in the description of the present invention, the detailed meanings of which are described in relevant parts of the description herein, have been selected at the discretion of the applicant. Furthermore, the present invention must be understood, not simply by the actual terms used but by the meanings of each term lying within.

FIG. 1 is a block diagram showing the configuration of an apparatus for displaying a three-dimensional (3D) image according to an exemplary embodiment of the present invention.

Referring to FIG. 1, the 3D image display apparatus 100 according to the present invention may include a display panel 110, a 3D image filter 120, a controller 130, a backlight 140, and a memory 150.

The display panel 110 includes a plurality of subpixels so as to display an image. The image may be a 2-dimensional (2D) image or a 3D image. The 3D image may be a stereo-view image or multi-view image. The stereo-view image refers to a pair of left and right images acquired by photographing the same subject using a left camera and a right camera spaced apart from each other by a constant distance. The multi-view image refers to three or more images acquired by photographing the same subject using three or more cameras each having a constant distance or angle, and the image acquired by each camera is defined as a view image. That is, the 3D image may include at least one piece of left view image data and at least one piece of right view image data.

The display panel 110 adjusts light generated therein or light received from the backlight 140 and displays an image.

The display panel 110 may be implemented by a plasma display panel (PDP) or a liquid crystal display (LCD). If the display panel 110 is implemented by an LCD, since the LCD does not have a self-emission function, the 3D image display device 100 may further include the backlight 140 as a light supply source. If the display panel 110 is implemented by a PDP, the 3D image display device 100 may not include the backlight 140.

Figure 2:
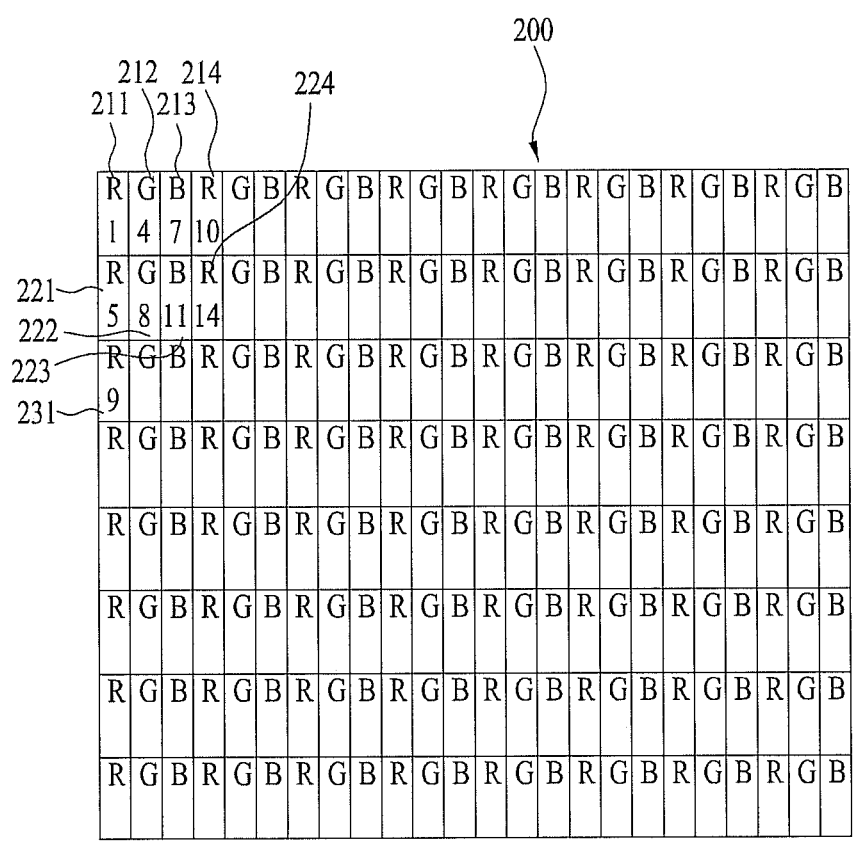
FIG. 2 is a diagram showing arrangement of subpixels of a display panel.

FIG. 2 is a diagram showing arrangement of subpixels of a display panel.

Referring to FIG. 2, red, green and blue subpixels are alternately arranged on the display panel 200 in a row direction. The row direction refers to a direction from a subpixel 211 to a subpixel 214 through subpixels 212 and 213. Since the red, green and blue subpixels are alternately arranged in the row direction, the subpixel 211 of a first row and a first column is a red (R) subpixel, the subpixel 212 of a first row and a second column is a green (G) subpixel, and the subpixel 213 of a first row and a third column is a blue (B) subpixel. In addition, the subpixel 214 of a first row and a fourth column is a red subpixel.

Subpixels having the same color are arranged on the display panel 200 in a column direction. The column direction refers to a direction from the subpixel 211 to a subpixel 231 through a subpixel 221. Since the subpixels having the same color are arranged in the column direction, a subpixel 221 of a second row and a first column is a red subpixel, similarly to the subpixel 211. A subpixel 222 of a second row and a second column is a green subpixel, similarly to the subpixel 212. A subpixel 223 of a second row and a third column is a blue subpixel, similarly to the subpixel 213, and a subpixel 224 of a second row and a fourth column is a red subpixel, similarly to the subpixel 214.

A numeral shown in each subpixel denotes the allocation number of a view image which will be displayed at a subpixel. For example, since a numeral "1" is shown in the subpixel 211, the subpixel 211 displays a first view image, that is, a view image having an allocation number of 1. Since a numeral "4" is shown in the subpixel 212, the subpixel 212 displays a fourth view image, that is, a view image having an allocation number of 4. Since a numeral "5" is shown in the subpixel 221, the subpixel 221 displays a fifth view image, that is, a view image having an allocation number of 5. Since a numeral "8" is shown in the subpixel 222, the subpixel 222 displays an eighth view image, that is, a view image having an allocation number of 8.

A pixel value to be displayed in a view image is determined according to the position of the subpixel. For example, since the subpixel 211 is located at the first row and the first column, a pixel value corresponding to the first row and the first column of the first view image is displayed. Since the subpixel 222 is located at the second row and the second column, a pixel value corresponding to the second row and the second column of the eighth view image is displayed.

The pixel value to be displayed in the view image is determined according to the kind of the subpixel. For example, since the kind of the subpixel 211 is a red subpixel, a red pixel value of pixel values corresponding to the first row and the first column of the first view image is displayed. Since the kind of the subpixel 222 is a green subpixel, a green pixel value of pixel values corresponding to the second row and the second column of the eighth view image is displayed.

In some embodiment, a numeral shown in each subpixel may be associated with a view image to be displayed at the subpixel between a left view image and a right view image. For example, 1 to 7 may be associated with the left view image and 8 to 15 may be associated with the right view image. In this case, since a numeral "1" is shown in the subpixel 211, the subpixel 211 displays a red pixel value of pixel values corresponding to a first row and a first column of the left view image. Since a numeral "4" is shown in the subpixel 212, the subpixel 212 displays a green pixel value of pixel values corresponding to a first row and a second column of the left view image. Since a numeral "5" is shown in the subpixel 221, the subpixel 221 displays a red pixel value of pixel values corresponding to a second row and a first column of the left view image. Since a numeral "8" is shown in the subpixel 222, the subpixel 222 displays a green pixel value of pixel values corresponding to a second row and a second column of the right view image. Since a numeral "9" is shown in the subpixel 231, the subpixel 231 displays a red pixel value of pixel values corresponding to a third row and a first column of the right view image.

The display panel 110 of FIG. 1 may have arrangement of subpixels of the display panel 200 of FIG. 2 or arrangement of subpixels different from that of the display panel 200 of FIG. 2. That is, the display panel 110 of FIG. 1 may have subpixels arranged in order of red, blue green subpixels, in order of green, blue and red subpixels or in order of green, red and blue subpixels in the row direction. The display panel 110 of FIG. 1 may have subpixels arranged in order of blue, red and green subpixels or in order of blue, green and red subpixels in the row direction.

The display panel 110 of FIG. 1 may have red, green and blue subpixels alternately arranged in the column direction and subpixels having the same color arranged in the row direction.

The 3D image filter 120 enables a viewer to view a multi-view image displayed on the display panel 110 as a 3D image and may include transparent areas and non-transparent areas arranged at a constant gap. Light emitted from the display panel 110 transmits through the transparent areas to reach the right eye or left eye of the viewer. The 3D image filter 120 may be a liquid crystal parallax barrier. The transparent area may be an aperture.

If the 3D image filter 120 is a liquid crystal parallax barrier, the non-transparent area may be a barrier and a pair of transparent area and non-transparent area is referred to as a pitch. The transparent area and the non-transparent area of the 3D image filter 120 may be moved under the control of the controller 130. At this time, the 3D image filter 120 may be fixed.

The non-transparent area of the 3D image filter 120 may be activated or deactivated. If the non-transparent area is activated, the non-transparent area blocks incident light. If the non-transparent area is deactivated, the non-transparent area transmits incident light.

Figure 3:
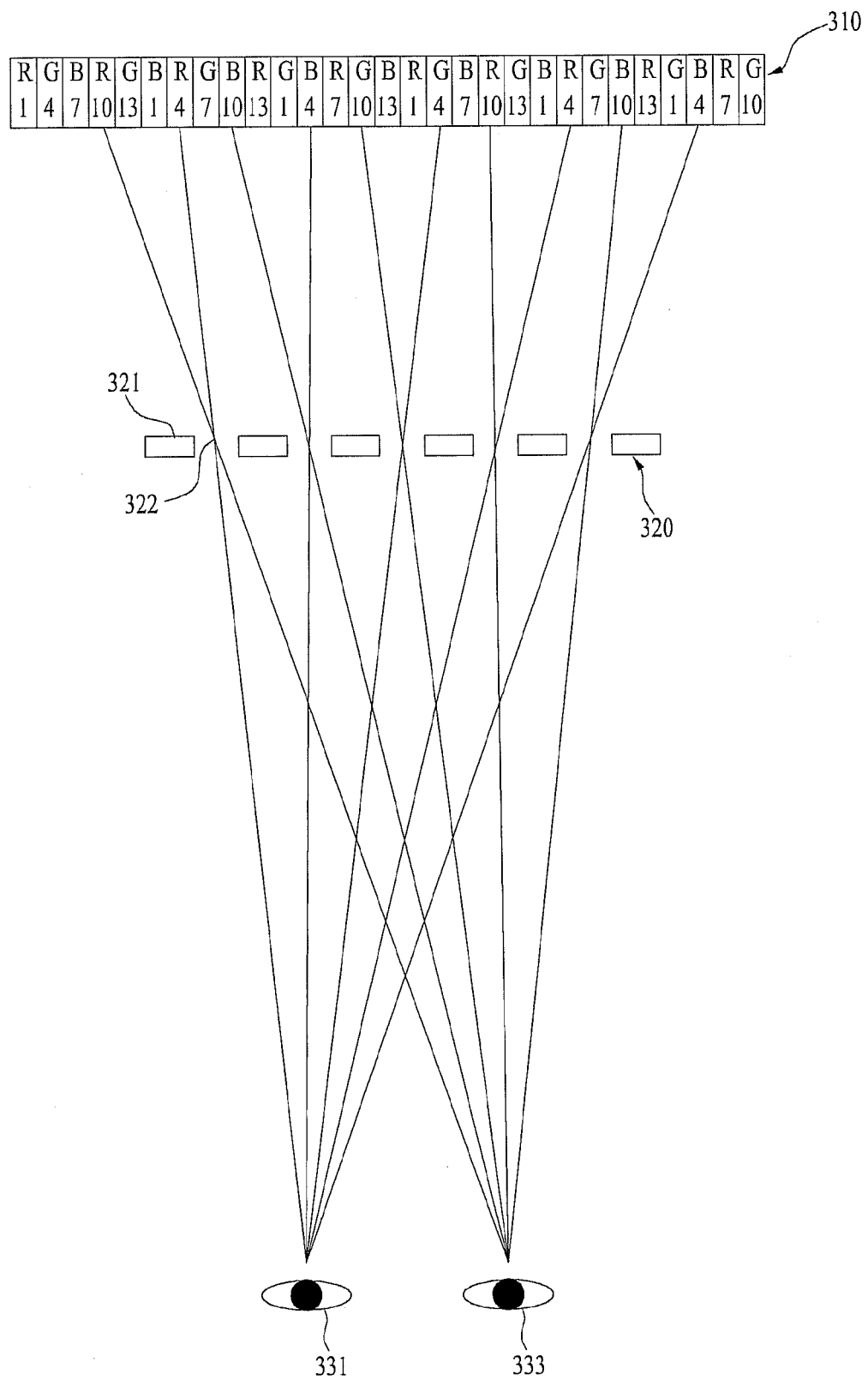
FIG. 3 is a diagram showing multi-view image separation of a 3D image filter.

FIG. 3 is a diagram showing multi-view image separation of a 3D image filter.

Referring to FIG. 3, the 3D image display apparatus 300 includes a display panel 310 for displaying a multi-view image (parallax image) in which a plurality of view images is mixed and a 3D image filter 320 disposed in front of the display panel 310 and having non-transparent areas 321 and transparent areas 322 arranged at a constant gap.

The 3D image filter 320 is separated from the display panel 310 by a constant distance. The non-transparent areas 321 and the transparent areas 322 are alternately arranged in a direction parallel to the display panel 310.

When the display panel 310 displays view images included in a multi-view image through subpixels, the viewer views the displayed view images through the 3D image filter 320. Each of the left eye and right eye of the viewer independently views one of the view images provided by the display panel 310, such that the viewer perceives a 3D effect.

A point where the viewer views a 3D image well is referred to as a sweet spot. That is, the sweet spot refers to a point where crosstalk, wherein view images overlap each other, does not occur. A sweet spot for viewing a fourth image may be a point 331 and a sweet spot for viewing a tenth image may be a point 333. If the right eye of the viewer is located at the point 333 and the left eye of the viewer is located at the point 331, the viewer can view the tenth image through the right eye and the fourth image through the left eye so as to view the 3D image using the fourth image and the tenth image.

The 3D image display apparatus 100 may be the 3D image display apparatus 300 or a 3D image display apparatus having the 3D image filter 120 arranged on a rear surface of the display panel 110.

Figure 4:
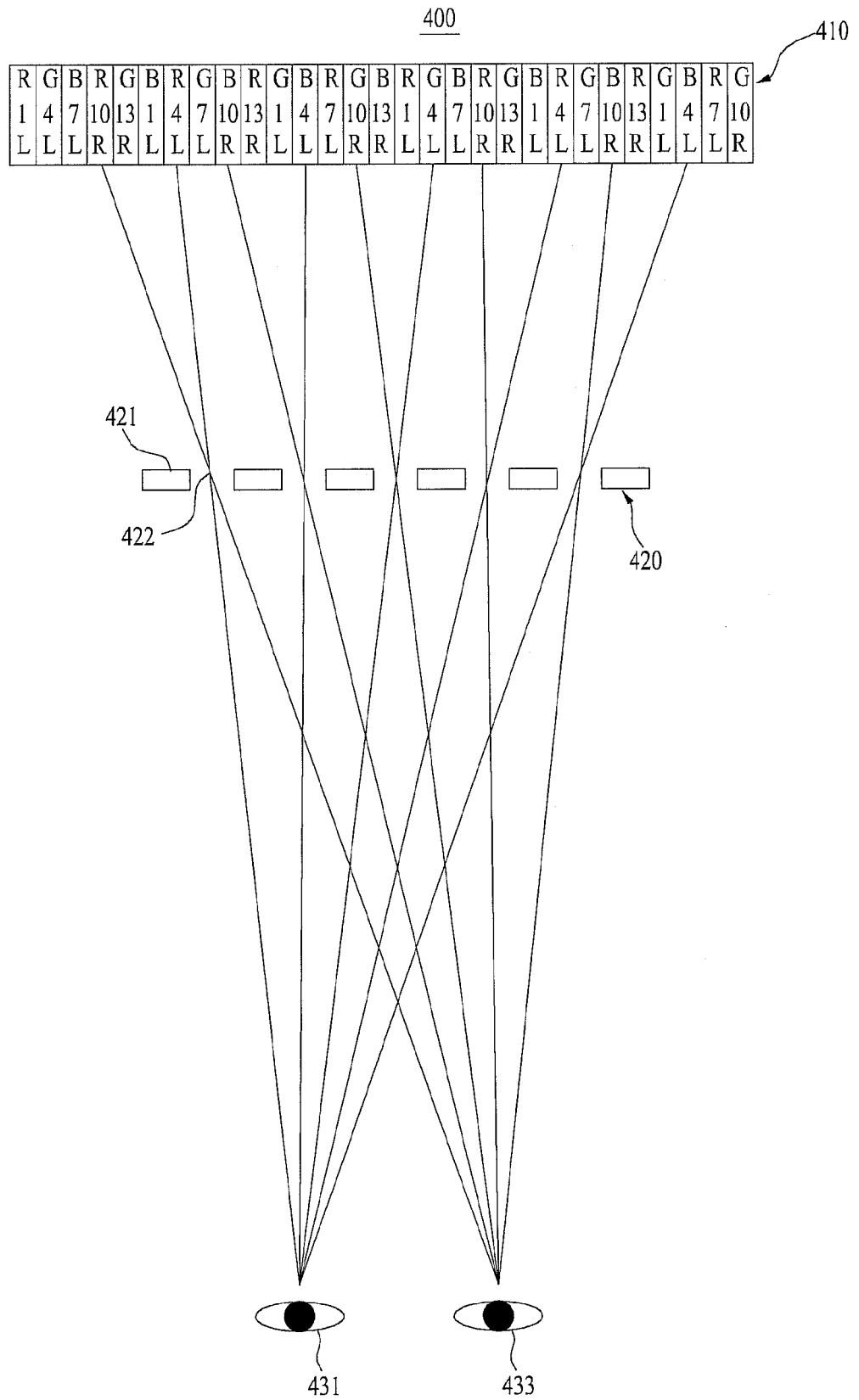
FIG. 4 is a diagram showing 2-view image separation of a 3D image filter.

FIG. 4 is a diagram showing 2-view image separation of a 3D image filter.

Referring to FIG. 4, a 3D image display apparatus includes a display panel 410 for displaying a multi-view image (parallax image) in which a plurality of view images is mixed and a 3D image filter 420 disposed ahead of the display panel 410 and having non-transparent areas 421 and transparent areas 422 arranged at a constant gap.

The 3D image filter 420 is separated from the display panel 410 by a constant distance. The non-transparent areas 421 and the transparent areas 422 are alternately arranged in a direction parallel to the display panel 410.

When the display panel 410 displays a left view image L and a right view image R through subpixels, the viewer views the displayed left view image L and right view image R through the 3D image filter 420. At this time, the viewer views the displayed left view image L and right view image R as independent view images according to the numbers allocated to the subpixels. That is, the display panel 410 displays the 2-view image as multi-view image, and each of the left eye and right eye of the viewer independently views one of the view images provided by the display panel 410, such that the viewer perceives a 3D effect. Each numeral shown in the display panel 410 may be number allocated to each subpixel or the number of the view image viewed to the user.

A sweet spot for viewing a fourth image may be a point 431 and a sweet spot for viewing a tenth image may be a point 433. If the right eye of the viewer is located at the point 433 and the left eye of the viewer is located at the point 431, the viewer can view the tenth image through the right eye and view the fourth image through the left eye so as to view the 3D image using the fourth image and the tenth image. Here, the fourth view image and the tenth view image are the left view image L and the right view image R, respectively.

The 3D image display apparatus 100 may be the 3D image display apparatus 400 or a 3D image display apparatus having the 3D image filter 120 arranged on a rear surface of the display panel 100.

Figure 5:
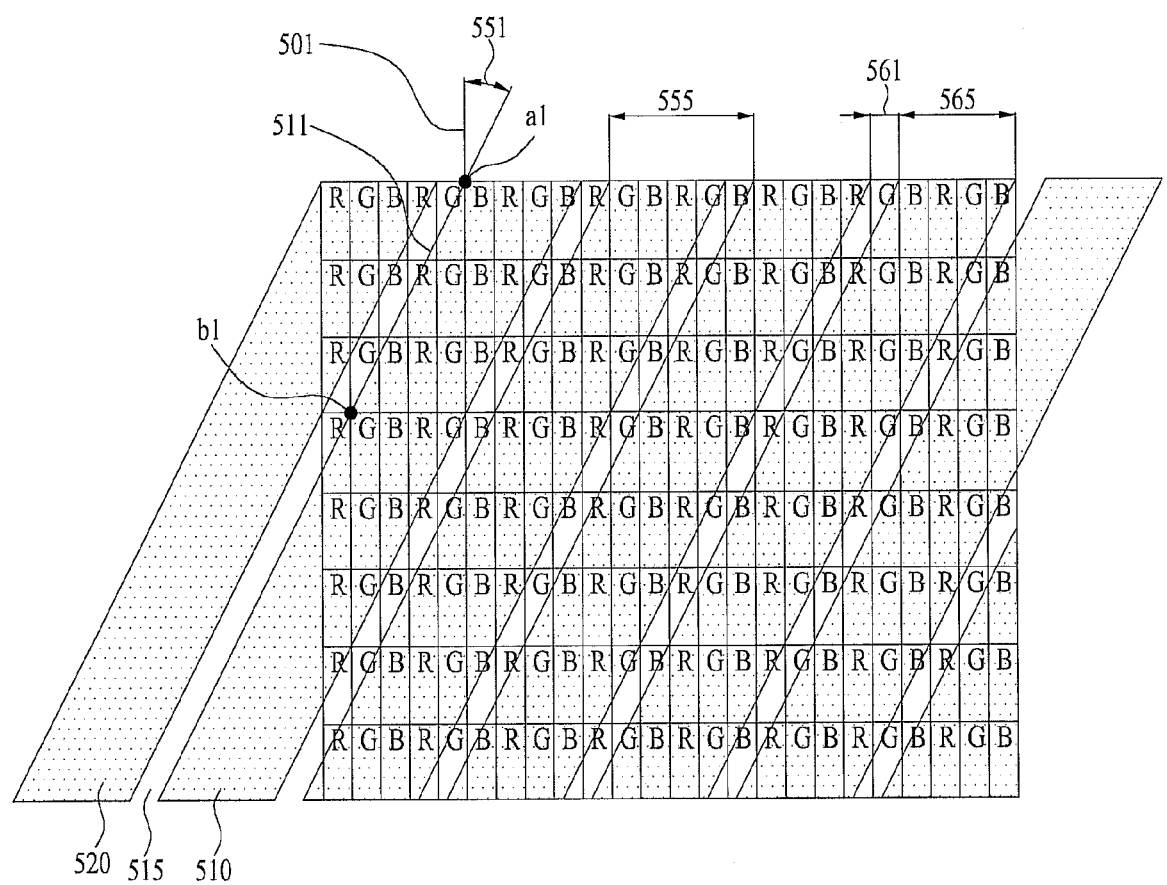
FIG. 5 is a diagram showing a 3D image filter, in which a non-transparent area is inclined, according to an exemplary embodiment of the present invention.

FIG. 5 is a diagram showing a 3D image filter, in which a non-transparent area is inclined, according to an exemplary embodiment of the present invention.

Referring to FIG. 5, a barrier period of the 3D image filter 120 may be 5 subpixels 555. The barrier period is a sum of the width of the non-transparent area and the width of the transparent area. The width of the non-transparent area may correspond to the total width of four subpixels and the width of the transparent area may correspond to the width of one subpixel. For example, the width of the non-transparent area 510 or the non-transparent area 520 corresponds to the total width 565 of four subpixels. The width of the transparent area 515 corresponds to the width 561 of one subpixel.

An edge defining the width of the non-transparent area may be inclined with respect to a vertical axis 501 of the display panel. For example, an edge 511 of the non-transparent area 510 is inclined with respect to the vertical axis 501 of the display panel.

The edge of the non-transparent area may be formed to pass through a point spaced apart from a start point to the left side of the start point by the width of the non-transparent area and spaced apart from the start point by the total length of a predetermined number of subpixels in the column direction. The predetermined number of subpixels may be three subpixels. That is, the edge of the non-transparent area may be formed to pass through a point b1 spaced apart from a start point a1 to the left side of the start point a1 by the width of the non-transparent area and spaced apart from the start point a1 by the total length of three subpixels in the column direction.

An inclination angle α 551 of the edge of the non-transparent area may be arctan(4Ph/3Pv). Here, Ph denotes the width of the subpixel and Pv denotes the length of the subpixel. For example, if Pv is three times Ph, the angle α may be arctan(4/9).

The edge of the non-transparent area may be inclined to the right or left with respect to the vertical axis 501 of the display panel. FIG. 5 shows the 3D image filter 120 in which the edge 511 of the non-transparent area is inclined to the right with respect to the vertical axis 501 of the display panel 110.

The controller 130 determines a view image which will be displayed at a subpixel of the display panel 110. The controller 130 may determine the view image which will be displayed at the subpixel of the display panel 110, according to at least one of the inclination direction of the edge of the non-transparent area and the number of view images.

The controller 130 may control activation and deactivation of the non-transparent areas of the 3D image filter according to the kind of the image to be displayed. If the displayed image is a 2D image, the controller 130 controls deactivation of the non-transparent areas. If the displayed image is a 3D image, the controller 130 controls activation of the non-transparent areas.

If the edge of the non-transparent area is inclined to the right, the controller 130 may determine a view image having an allocation number greater than that of a view image of a previous subpixel in the row direction by a first number, as a view image to be displayed at a subpixel. If the view image having the allocation number greater than that of the view image of the previous subpixel by the first number is not present, the controller 130 may determine a view image having an allocation number having a difference between the allocation number of the view image, which is greater than that of the view image of the previous subpixel by the first number, and a maximum allocation number, as a view image to be displayed at a subpixel. If the edge of the non-transparent area is inclined to the right, the controller 130 may determine a view image having an allocation number greater than that of a view image of a previous subpixel in the column direction by a second number, as a view image to be displayed at a subpixel. If the view image having the allocation number greater than that of the view image of the previous subpixel by the second number is not present, the controller 130 may determine a view image having an allocation number having a difference between the allocation number of the view image, which is greater than that of the view image of the previous subpixel by the second number, and a maximum allocation number, as a view image to be displayed at a subpixel. The first number and the second number may be determined based on at least one of the inclination angle of the edge of the non-transparent area and the number of view images.

If the edge of the non-transparent area is inclined to the left, the controller 130 may determine a view image having an allocation number less than that of a view image of a previous subpixel in the row direction by a third number, as a view image to be displayed at a subpixel. If the view image having the allocation number less than that of the view image of the previous subpixel by the third number is not present, the controller 130 may determine a view image having an allocation number having a sum of the allocation number of the view image, which is less than that of the view image of the previous subpixel by the third number, and a maximum allocation number, as a view image to be displayed at a subpixel. If the edge of the non-transparent area is inclined to the left, the controller 130 may determine a view image having an allocation number greater than that of a view image of a previous subpixel in the column direction by a fourth number, as a view image to be displayed at a subpixel. If the view image having the allocation number greater than that of the view image of the previous subpixel by the fourth number is not present, the controller 130 may determine a view image having an allocation number having a difference between the allocation number of the view image, which is greater than that of the view image of the previous subpixel by the fourth number, and a maximum allocation number, as a view image to be displayed at a subpixel. The third number and the fourth number may be determined based on at least one of the inclination angle of the edge of the non-transparent area and the number of view images.

The controller 130 may determine the view image to be displayed at each subpixel of the display panel 110 to one of two view images based on the numbers allocated to the subpixels of the display panel 110. Here, one of the two view images may be a left view image and the other of the two view images may be a right view image. Here, the numbers may be allocated to the subpixels of the display panel 110 in advance or may be calculated based on at least one of information detected by the controller 130 or the inclination direction of the edge of the non-transparent area. The detected information may be information indicating the positions of the viewer's eyes or information indicating the position of a center point of the viewer's eyes. The controller 130 may calculate the numbers such that the center point of both eyes matches a multi-view center point.

If the edge of the non-transparent area is inclined to the right, the number allocated to the subpixel may be determined to a number greater than the number allocated to a previous subpixel in a row direction by a fifth number. If the number greater than the number allocated to the previous subpixel by the fifth number is not present, the number allocated to the subpixel may be determined to a difference between the number greater than the number allocated to the previous subpixel by the fifth number and a maximum number. The number of the subpixel may be determined to a number greater than the number allocated to a previous subpixel in a column direction by a sixth number. If the number greater than the number allocated to the previous subpixel by the sixth number is not present, the number allocated to the subpixel may be determined to a difference between the number greater than the number allocated to the previous subpixel by the sixth number and a maximum number. The fifth number and the sixth number may be determined based on at least one of the inclination angle of the edge of the non-transparent area and the number of numbers allocated to the subpixels.

If the edge of the non-transparent area is inclined to the left, the number allocated to the subpixel may be determined to a number less than the number allocated to a previous subpixel in a row direction by a seventh number. If the number less than the number allocated to the previous subpixel by the seventh number is not present, the number allocated to the subpixel may be determined to a sum of the number less than the number allocated to the previous subpixel by the seventh number and a maximum number. The number allocated to the subpixel may be determined to a number greater than the number allocated to a previous subpixel in a column direction by an eighth number. If the number greater than the number allocated to the previous subpixel by the eighth number is not present, the number allocated to the subpixel may be determined to a difference between the number greater than the number allocated to the previous subpixel by the eighth number and a maximum number. The seventh number and the eighth number may be determined based on at least one of the inclination angle of the edge of the non-transparent area and the number of numbers allocated to the subpixels.

The memory 150 may store information indicating the numbers allocated to the subpixels of the display panel 110. The controller 130 may determine the view image to be displayed at each subpixel of the display panel to one of two view images based on the stored information. The controller 130 may calculate the numbers allocated to the subpixels based on the stored information and the detected information and determine the view image to be displayed on the display panel 110 to one of two view images based on the calculated numbers. The detected information may be information indicating the positions of the viewer's eyes or information indicating the position of the center point of the viewer's eyes. The controller 130 may calculate the numbers such that the center point of both eyes matches a multi-view center point.

Figure 6:
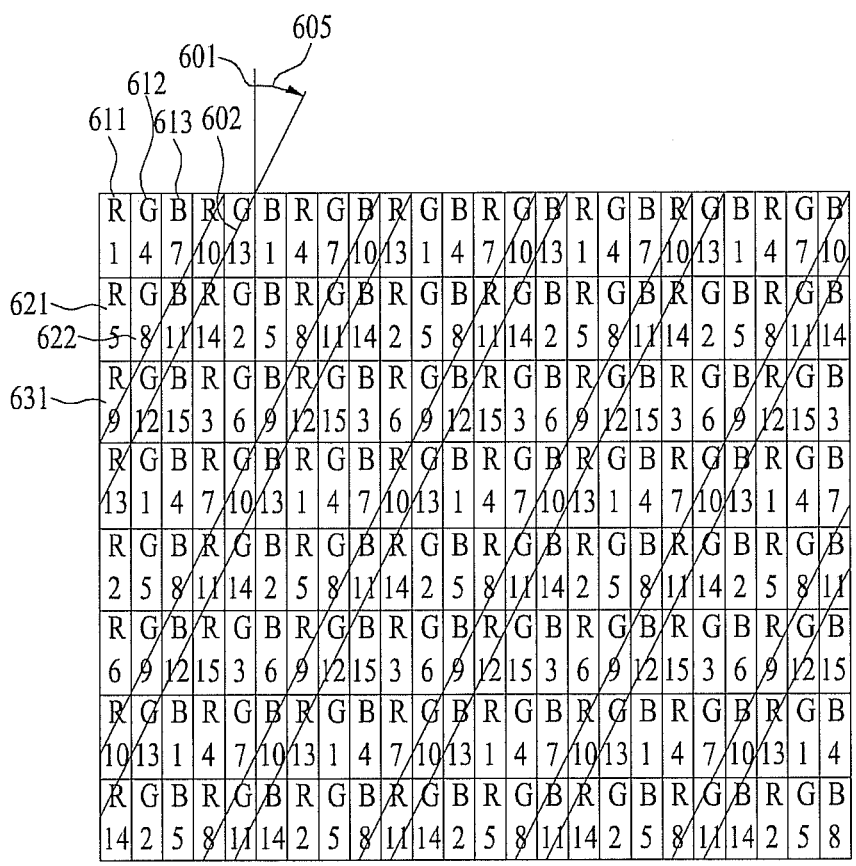
FIG. 6 is a diagram showing arrangement of multiple view images to be displayed at subpixels according to an exemplary embodiment of the present invention.

FIG. 6 is a diagram showing arrangement of multiple view images to be displayed at subpixels.

FIG. 6 shows arrangement of view images to be displayed at subpixels if the edge 602 of the non-transparent area is inclined to the right with respect to the vertical axis 601 of the display panel 110 by an angle arctan(4/9). FIG. 6 shows arrangement of view images when 15 view images respectively having allocation numbers 1 to 15 are displayed. FIG. 6 shows arrangement of view images to be displayed at subpixels in the case where the first number is set to 3 and the second number is set to 4. The first number and the second number may be determined based on the angle 605.

Referring to FIG. 6, the controller 130 displays a first view image having an allocation number of 1 at the subpixel 611 of the first row and the first column. A view image to be displayed at the subpixel 612 of the first row and the second column is a fourth view image having an allocation number greater than that of the first view image by the first number of 3. A view image to be displayed at a subpixel 613 of the first row and the third column is a seventh view image having an allocation number greater than that of the fourth view image by the first number of 3. A view image to be displayed at a subpixel of the first row and the fourth column is a tenth view image having an allocation number greater than that of the seventh view image by the first number of 3. A view image to be displayed at a subpixel of the first row and the fifth column is a thirteenth view image having an allocation number greater than that of the tenth view image by the first number of 3. A view image to be displayed at a subpixel of the first row and the sixth column is a first view image having an allocation number having a difference 1 between the allocation number 16 of a sixteenth view image and a maximum allocation number 15, because the sixteenth view image having the allocation number 16 greater than that of the thirteenth view image by the first number of 3 is not present. A view image to be displayed at a subpixel of the first row and the seventh column is a fourth view image having an allocation number greater than that of the first view image by the first number of 3.

A view image 621 to be displayed at a subpixel of the second row and the first column is a fifth view image having an allocation number greater than that of the first view image, which is the view image of the subpixel of the first row and the first column as the previous subpixel in the column direction, by the second number of 4. A view image 631 to be displayed at a subpixel of the third row and the first column is a ninth view image having an allocation number greater than that of the fifth view image by the second number of 4.

A view image 622 to be displayed at a subpixel of the second row and the second column is an eighth view image having an allocation number greater than that of the fifth view image, which is the view image of the subpixel of the second row and the first column, by the first number of 3. The view image 622 is the eighth view image having an allocation number greater than that of the fourth view image, which is the view image of the subpixel of the first row and the second column, by the second number of 4, and is equal to the view image determined in the row direction.

As shown in FIG. 6, since the 3D image display device 100 according to the present invention displays five view images among 15 view images in one row, it is possible to improve vertical resolution as compared to the case where all 15 view images are displayed in one row. Since the non-transparent area is inclined with respect to the vertical axis of the display panel in the 3D image display device 100 according to the present invention, a pattern in which a bright area and a dark area are regularly repeated is suppressed so as to reduce moiré phenomenon.

Figure 7:
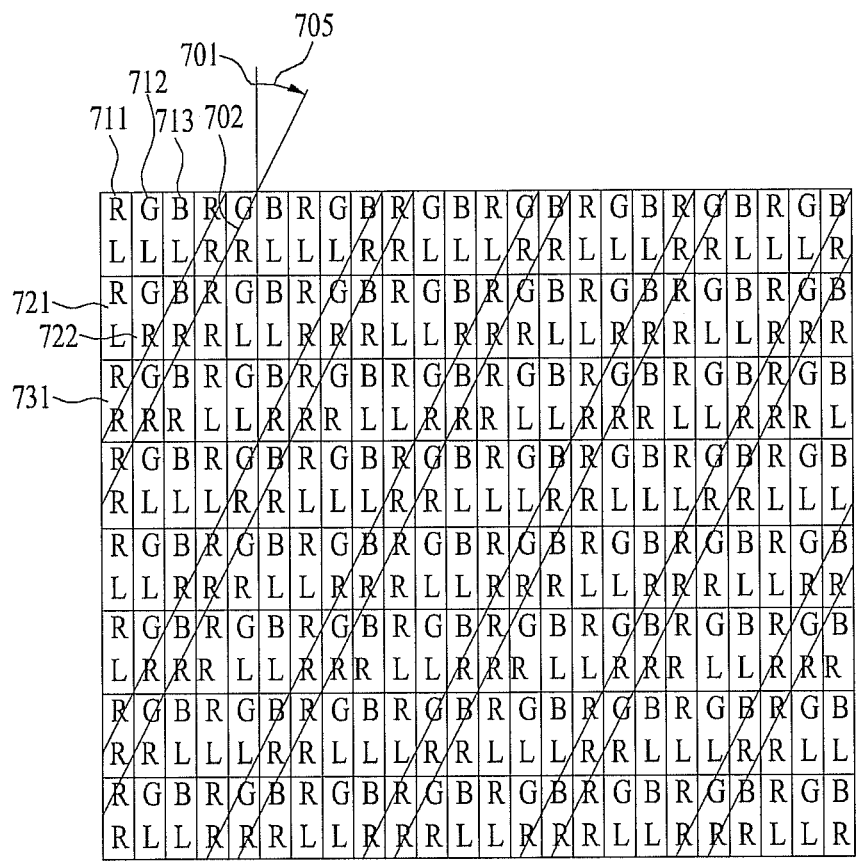
FIG. 7 is a diagram showing arrangement of 2 view images to be displayed at subpixels according to an exemplary embodiment of the present invention.

FIG. 7 is a diagram showing arrangement of 2 view images to be displayed at subpixels according to an exemplary embodiment of the present invention.

FIG. 7 shows an embodiment in which first to seventh view images are arranged as left view images and eighth to fifteenth view images are arranged as right view images in the embodiment of the arrangement of the multiple view images of FIG. 6. In FIG. 7, "L" denotes the left view image and "R" denotes the right view image.

The number shown in the subpixel in FIG. 6 may be the number allocated to the subpixel in the embodiment of FIG. 7. That is, in the embodiment of FIG. 7, 15 numbers are allocated to the subpixels and the numbers allocated to the subpixels are 1 to 15. And the number's turn is the same as the number. a number 3's turn is 3 and a number 5's turn is 5.

FIG. 7 shows arrangement of view images to be displayed at subpixels if the edge 702 of the non-transparent area is inclined to the right by an angle acrtan(4/9) with respect to the vertical axis 701 of the display panel 110. FIG. 7 shows arrangement of the view images to be displayed at subpixels if the fifth number is set to 3 and the sixth number of set to 4 and FIG. 6 shows the numbers allocated to the subpixels if the fifth number is set to 3 and the sixth number is set to 4. The fifth number and the sixth number may be determined based on the angle 705.

Referring to FIG. 7, the controller 130 determines the view images to be displayed at the subpixels, to which the numbers 1 to 7 are allocated, in FIG. 6 as left view images L and determines the view images to be displayed at the subpixels, to which the numbers 8 to 15 are allocated to, as right view images R.

Since the number allocated to the subpixel 711 is 1, the subpixel 711 displays the left view image L. Since the number allocated to the subpixel 712 is 4, the subpixel 712 displays the left view image L. Since the number allocated to the subpixel 713 is 7, the subpixel 713 displays the left view image L. Since the number allocated to the subpixel 721 is 5, the subpixel 721 displays the left view image L. Since the number allocated to the subpixel 722 is 8, the subpixel 722 displays the right view image R. Since the number allocated to the subpixel 731 is 9, the subpixel 731 displays the right view image R.

Figure 8:
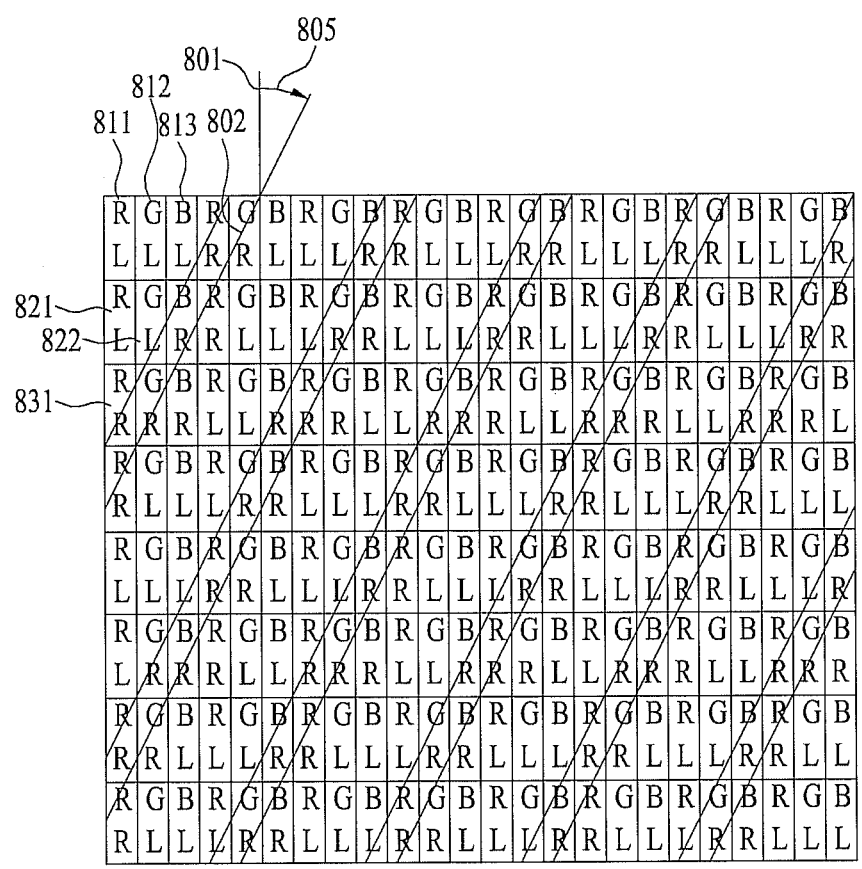
FIG. 8 is a diagram showing arrangement of 2 view images to be displayed at subpixels according to another embodiment of the present invention.

FIG. 8 is a diagram showing arrangement of 2 view images to be displayed at subpixels according to another embodiment of the present invention.

FIG. 8 shows an embodiment in which first to eighth view images are arranged as left view images and ninth to fifteenth view images are arranged as right view images in the embodiment of the arrangement of the multiple view images of FIG. 6. In FIG. 8, "L" denotes the left view image and "R" denotes the right view image.

The number shown in the subpixel in FIG. 6 may be the number allocated to the subpixel in the embodiment of FIG. 8. That is, in the embodiment of FIG. 8, 15 numbers are allocated to the subpixels and the numbers allocated to the subpixels are 1 to 15. And the number's turn is the same as the number. A number 3's turn is 3 and a number 5's turn is 5.

FIG. 8 shows arrangement of view images to be displayed at subpixels if the edge 802 of the non-transparent area is inclined to the right by an angle acrtan(4/9) with respect to the vertical axis 801 of the display panel 110. FIG. 8 shows arrangement of the view images to be displayed at subpixels if the fifth number is set to 3 and the sixth number of set to 4 and FIG. 6 shows the numbers allocated to the subpixels if the fifth number is set to 3 and the sixth number is set to 4. The fifth number and the sixth number may be determined based on the angle 805.

Referring to FIG. 8, the controller 130 determines the view images to be displayed at the subpixels having numbers 1 to 8 in FIG. 6 as left view images L and determines the view images to be displayed at the subpixels having numbers 9 to 15 as right view images R.

Since the number allocated to the subpixel 811 is 1, the subpixel 811 displays the left view image L. Since the number allocated to the subpixel 812 is 4, the subpixel 812 displays the left view image L. Since the number allocated to the subpixel 813 is 7, the subpixel 813 displays the left view image L. Since the number allocated to the subpixel 821 is 5, the subpixel 821 displays the left view image L. Since the number allocated to the subpixel 822 is 8, the subpixel 822 displays the left view image L. Since the number allocated to the subpixel 831 is 9, the subpixel 831 displays the right view image R.

Figure 9:
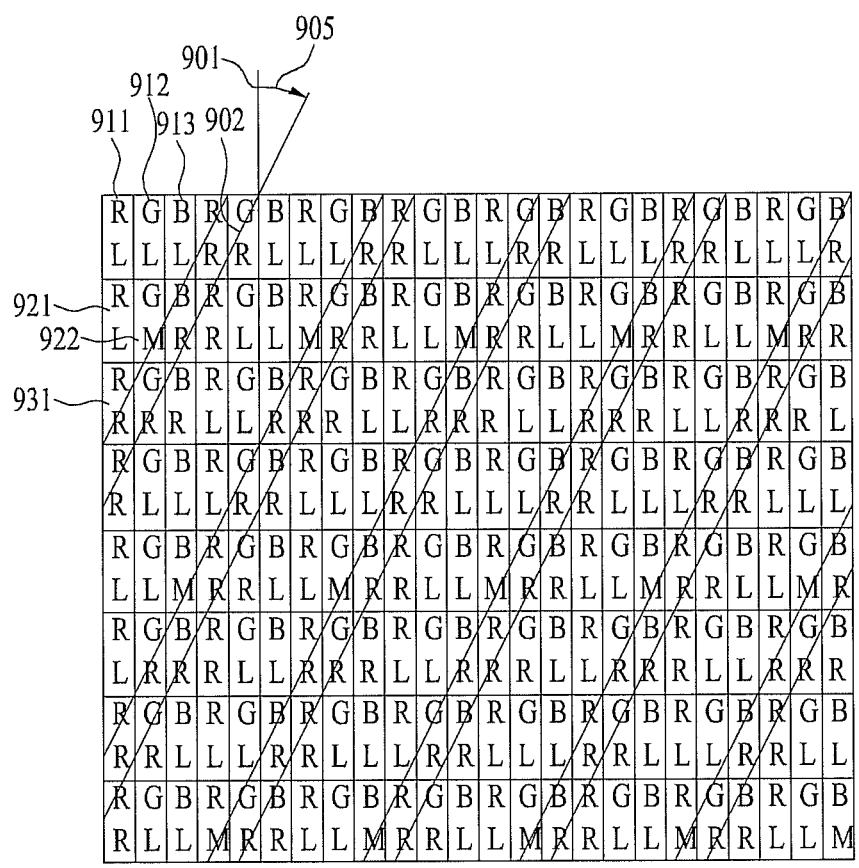
FIG. 9 is a diagram showing arrangement of 2 view images to be displayed at subpixels according to another embodiment of the present invention.

FIG. 9 is a diagram showing arrangement of 2 view images to be displayed at subpixels according to another embodiment of the present invention.

FIG. 9 shows an embodiment in which first to seventh view images are arranged as left view images, an eighth view image is arranged as an image having an average pixel value of the pixel value of the left view image and the pixel value of the right view image, and ninth to fifteenth view images are arranged as right view images in the embodiment of the arrangement of the multiple view images of FIG. 6. In FIG. 9, "L" denotes the left view image, "R" denotes the right view image, and "M" denotes the image having the average pixel value of the pixel value of the left view image and the pixel value of the right view image.

The number shown in the subpixel in FIG. 6 may be the number allocated to the subpixel in the embodiment of FIG. 9. That is, in the embodiment of FIG. 9, 15 numbers are allocated to the subpixels and the numbers allocated to the subpixels are 1 to 15. And the number's turn is the same as the number. A number 3's turn is 3 and a number 5's turn is 5.

FIG. 9 shows arrangement of view images to be displayed at subpixels if the edge 902 of the non-transparent area is inclined to the right by an angle acrtan(4/9) with respect to the vertical axis 901 of the display panel 110. FIG. 9 shows arrangement of the view images to be displayed at subpixels if the fifth number is set to 3 and the sixth number of set to 4 and FIG. 6 shows the numbers allocated to the subpixels if the fifth number is set to 3 and the sixth number is set to 4. The fifth number and the sixth number may be determined based on the angle 905.

Referring to FIG. 9, the controller 130 determines the view images to be displayed at the subpixels, to which the numbers 1 to 7 are allocated, in FIG. 6 as left view images L, determines the view image to be displayed at the subpixel, to which a number 8 is allocated, as the image having the average pixel value M of the pixel value of the left view image and the pixel value of the right view image, and determines the view images to be displayed at the subpixels, to which the numbers 9 to 15 are allocated, as right view images R.

Since the number allocated to the subpixel 911 is 1, the subpixel 911 displays the left view image L. Since the number allocated to the subpixel 912 is 4, the subpixel 912 displays the left view image L. Since the number allocated to the subpixel 913 is 7, the subpixel 913 displays the left view image L. Since the number allocated to the subpixel 921 is 5, the subpixel 921 displays the left view image L. Since the number allocated to the subpixel 922 is 8, the subpixel 922 displays the image having the average pixel value M of the pixel value of the left view image and the pixel value of the right view image. Since the number allocated to the subpixel 931 is 9, the subpixel 931 displays the right view image R.

In some embodiments, in the embodiments of FIGS. 7 to 9, the controller 130 may determine the view images to be displayed at the subpixels based on the numbers allocated to the subpixels of the display panel 110 such that the left view images and the right view images are exchanged with each other. The controller 130 may determine the subpixels, to which the numbers 1 to 7 are allocated, in FIG. 6 as the right view images R and determine the subpixels, to which the numbers 8 to 15 are allocated, as the left view images L. Alternatively, the controller 130 may determine the subpixels, to which the numbers 1 to 8 are allocated, in FIG. 6 as the right view images R and determine the subpixels, to which the numbers 9 to 15 are allocated, as the left view images L. As another example, the controller 130 may determine the subpixels, to which the numbers 1 to 7 are allocated, in FIG. 6 as the right view images R, determine the subpixel, to which the number 8 is allocated, as the image having the average pixel value M of the pixel value of the left view image and the pixel value of the right view image, and determine the subpixels, to which the numbers 9 to 15 are allocated, as the left view images L.

Figure 10:
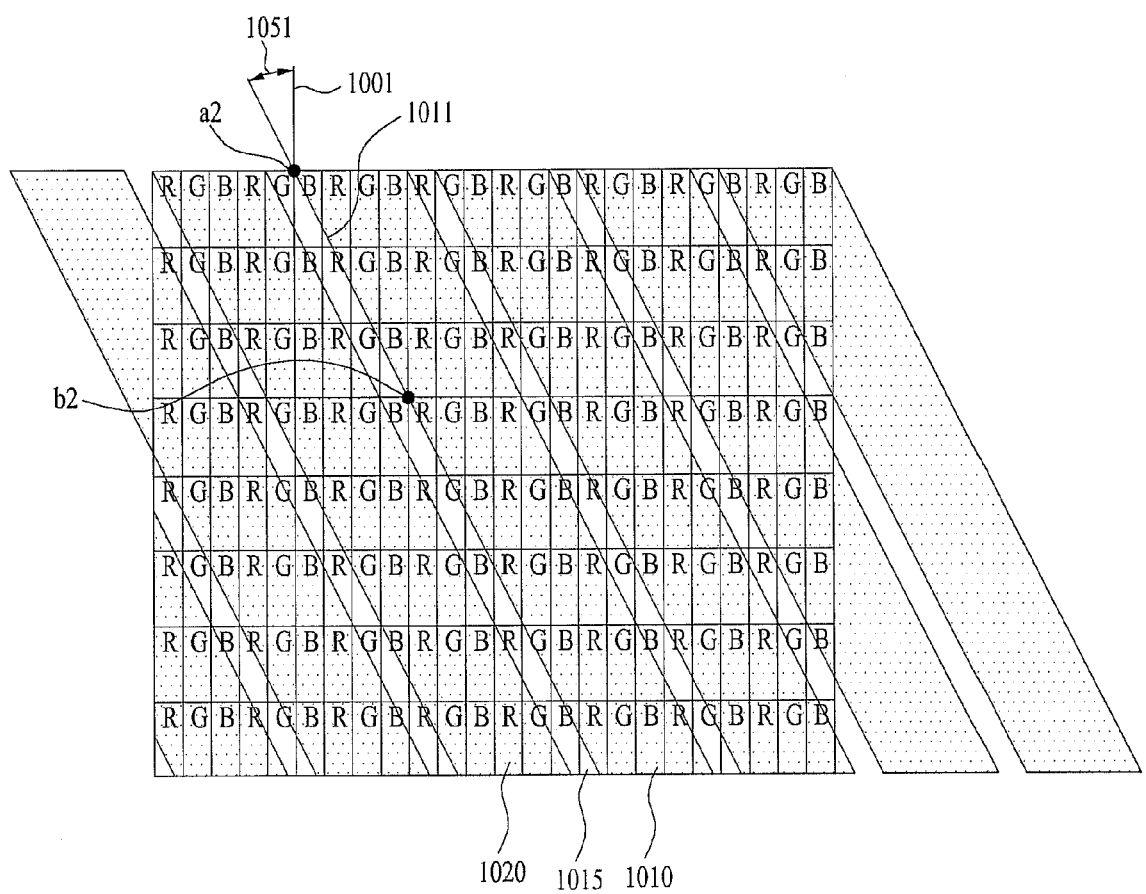
FIG. 10 is a diagram showing a 3D image filter, in which a non-transparent area is inclined, according to an exemplary embodiment of the present invention.

FIG. 10 is a diagram showing a 3D image filter, in which a non-transparent area is inclined, according to an exemplary embodiment of the present invention.

FIG. 10 shows a 3D image filter 120 in which the edge of the non-transparent area is inclined to the left with respect to the vertical axis of the display panel.

Referring to FIG. 10, the edge of the non-transparent area may be formed to pass through a point spaced apart from a start point to the right side of the start point by the width of the non-transparent area and spaced apart from the start point by the total length of a predetermined number of subpixels in the column direction. The predetermined number of subpixels may be three subpixels. That is, the edge 1011 of the non-transparent area 1010 may be formed to pass through a point b2 spaced apart from a start point a2 to the right side of the start point a2 by the width of the non-transparent area and spaced apart from the start point a2 by the total length of three subpixels in the column direction. A transparent area 1015 is formed between the non-transparent area 1010 and the non-transparent area 1020.

An inclination angle α 1051 between the edge of the non-transparent area 1011 and the vertical axis 1001 of the display panel may be arctan(4Ph/3Pv). Here, Ph denotes the width of the subpixel and Pv denotes the length of the subpixel. For example, if Pv is three times Ph, the angle α may be arctan (4/9).

Figure 11:
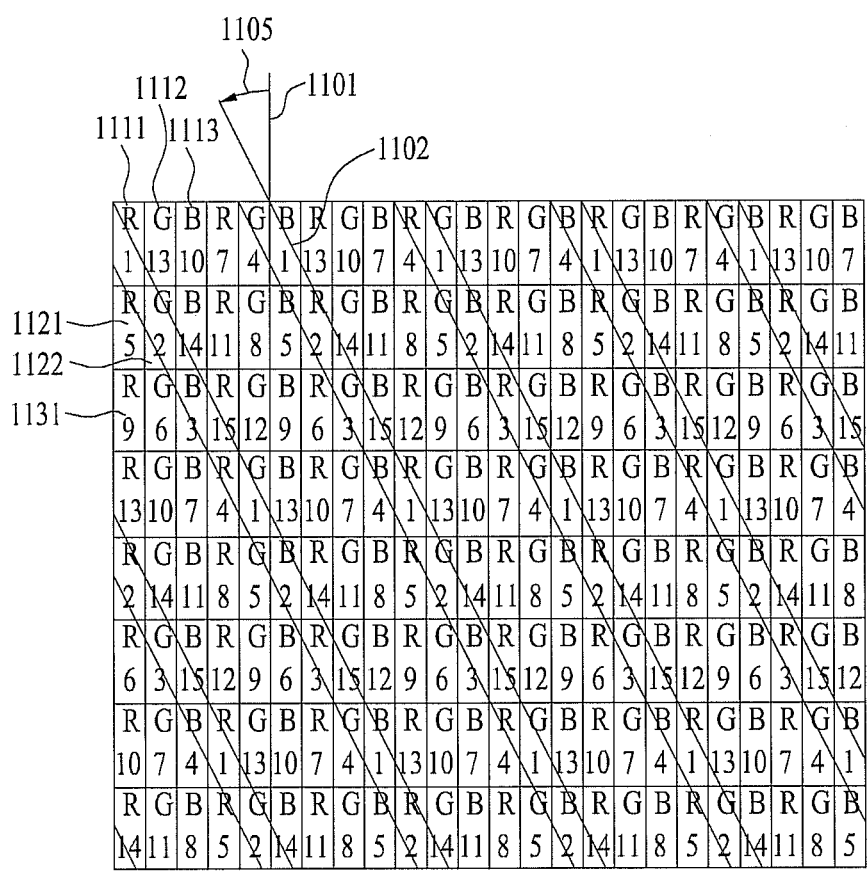
FIG. 11 is a diagram showing arrangement of view images to be displayed at subpixels according to another embodiment of the present invention.

FIG. 11 is a diagram showing arrangement of view images to be displayed at subpixels.

FIG. 11 shows arrangement of view images to be displayed at subpixels if the edge 1102 of the non-transparent area is inclined to the left with respect to the vertical axis 1101 of the display panel 110 by an angle arctan(4/9). FIG. 11 shows arrangement of view images when 15 view images respectively having allocation numbers 1 to 15 are displayed. FIG. 11 shows arrangement of view images to be displayed at subpixels if the third number is set to 3 and the fourth number is set to 4. The third number and the fourth number may be determined based on the angle 1105.

Referring to FIG. 11, the controller 130 displays a first view image at the subpixel 1111 of the first row and the first column. A view image to be displayed at the subpixel 1112 of the first row and the second column is a thirteenth view image having an allocation number 13 which is a sum of an allocation number −2 less than that of the first view image by the third number of 3 and a maximum allocation number 15, because the view image having the allocation number −2 less than that of the first view image by the third number of 3 is not present. A view image to be displayed at a subpixel 1113 of the first row and the third column is a tenth view image having an allocation number less than that of the thirteenth view image by the third number of 3. A view image to be displayed at a subpixel of the first row and the fourth column is a seventh view image having an allocation number less than that of the tenth view image by the third number of 3. A view image to be displayed at a subpixel of the first row and the fifth column is a fourth view image having an allocation number less than that of the seventh view image by the third number of 3. A view image to be displayed at a subpixel of the first row and the sixth column is a first view image having an allocation number less than that of the fourth view image by the third number of 3. A view image to be displayed at a subpixel of the first row and the seventh column is a thirteenth view image having an allocation number 13 which is a sum of an allocation number −2 less than that of the first view image and a maximum allocation number 15, because the view image having the allocation number −2 less than that of the first view image by the third number of 3 is not present.

A view image 1121 to be displayed at a subpixel of the second row and the first column is a fifth view image having an allocation number greater than that of the first view image, which is the view image of the subpixel of the first row and the first column as the previous subpixel in the column direction, by the fourth number of 4. A view image 1131 to be displayed at a subpixel of the third row and the first column is a ninth view image having an allocation number greater than that of the fifth view image by the fourth number of 4.

A view image 1122 to be displayed at a subpixel of the second row and the second column is a second view image having an allocation number less than that of the fifth view image by the third number of 3. The view image 1122 is the second view image having an allocation number having a difference 2 between the allocation number 17 greater than the allocation number 13 of the view image of the subpixel of the first row by the fourth number of 4 and the second column and a maximum allocation number 15, and is equal to the view image determined in the row direction.

The backlight 140 supplies light to the display panel 110. The backlight 140 is disposed on the rear surface of the display panel 110 and may include one or more backlight lamps and a circuit for driving the lamps. Light supplied by the backlight 140 may not have a polarized component. If the display panel 110 is a PDP, the 3D display apparatus 100 may not have the backlight 140.

Figure 12:
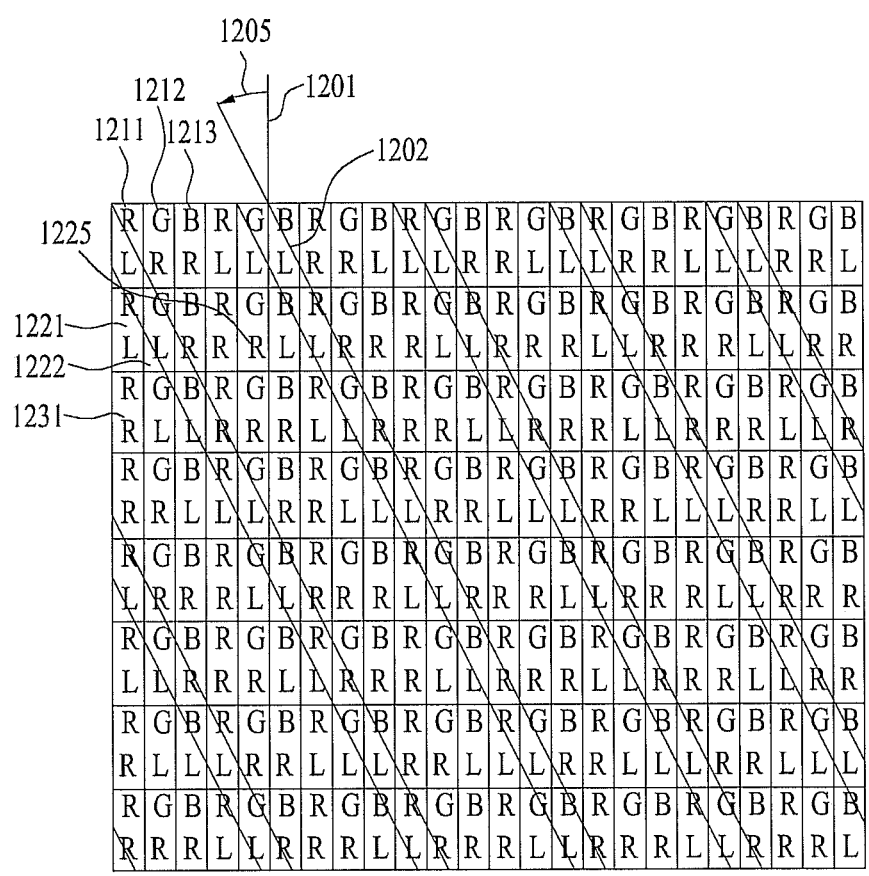
FIG. 12 is a diagram showing arrangement of 2 view images to be displayed at subpixels according to another embodiment of the present invention.

FIG. 12 is a diagram showing arrangement of 2 view images to be displayed at subpixels according to another embodiment of the present invention.

FIG. 12 shows an embodiment in which first to seventh view images are arranged as left view images and eighth to fifteenth view images are arranged as right view images in the embodiment of the arrangement of the multiple view images of FIG. 11. In FIG. 12, "L" denotes the left view image and "R" denotes the right view image.

The number shown in the subpixel in FIG. 11 may be the number allocated to the subpixel in the embodiment of FIG. 12. That is, in the embodiment of FIG. 12, 15 numbers are allocated to the subpixels and the numbers allocated to the subpixels are 1 to 15. And the number's turn is the same as the number. a number 3's turn is 3 and a number 5's turn is 5.

FIG. 12 shows arrangement of view images to be displayed at subpixels if the edge 1202 of the non-transparent area is inclined to the left by an angle acrtan(4/9) with respect to the vertical axis 1201 of the display panel 110. FIG. 12 shows arrangement of the view images to be displayed at subpixels if the seventh number is set to 3 and the eighth number of set to 4 and FIG. 11 shows the numbers allocated to the subpixels if the seventh number is set to 3 and the eighth number is set to 4. The seventh number and the eighth number may be determined based on the angle 1205.

Referring to FIG. 12, the controller 130 determines the view images to be displayed at the subpixels, to which the numbers 1 to 7 are allocated, in FIG. 11 as left view images L and determines the view images to be displayed at the subpixels, to which the numbers 8 to 15 are allocated, as right view images R.

Since the number allocated to the subpixel 1211 is 1, the subpixel 1211 displays the left view image L. Since the number allocated to the subpixel 1212 is 13, the subpixel 1212 displays the right view image R. Since the number allocated to the subpixel 1213 is 10, the subpixel 1213 displays the right view image R. Since the number allocated to the subpixel 1221 is 5, the subpixel 1221 displays the left view image L. Since the number allocated to the subpixel 1222 is 2, the subpixel 1222 displays the left view image L. Since the number allocated to the subpixel 1231 is 9, the subpixel 1231 displays the right view image R. Since the number allocated to the subpixel 1225 is 8, the subpixel 1225 displays the right view image R.

Figure 13:
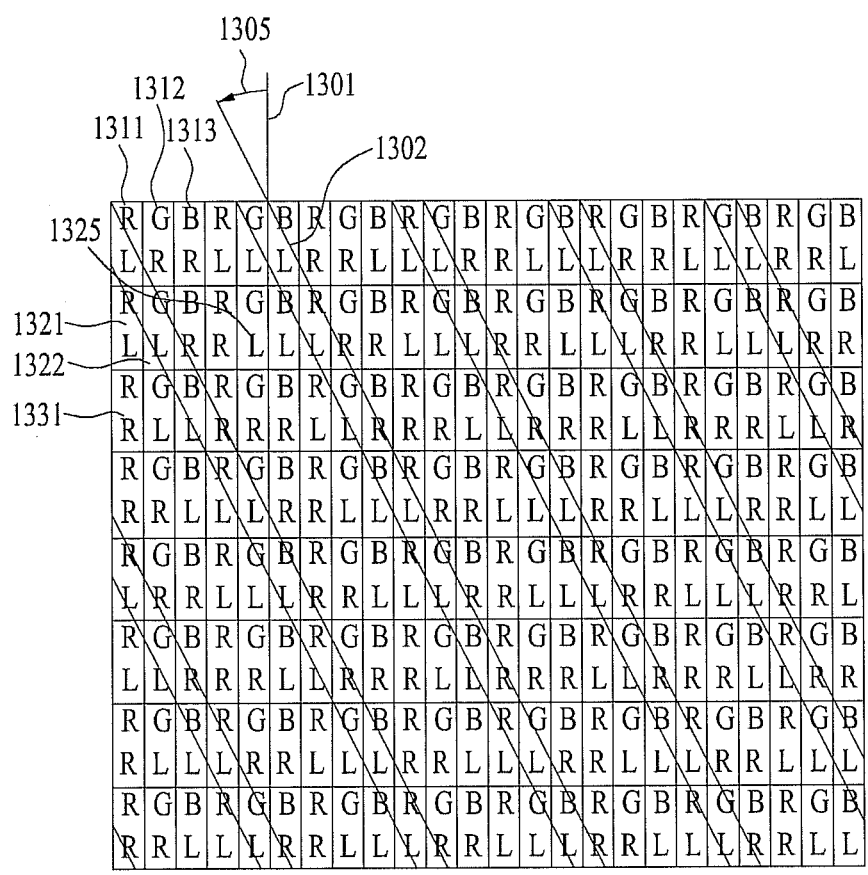
FIG. 13 is a diagram showing arrangement of 2 view images to be displayed at subpixels according to another embodiment of the present invention.

FIG. 13 is a diagram showing arrangement of 2 view images to be displayed at subpixels according to another embodiment of the present invention.

FIG. 13 shows an embodiment in which first to eighth view images are arranged as left view images and ninth to fifteenth view images are arranged as right view images in the embodiment of the arrangement of the multiple view images of FIG. 6. In FIG. 13, "L" denotes the left view image and "R" denotes the right view image.

The number shown in the subpixel in FIG. 11 may be the number allocated to the subpixel in the embodiment of FIG. 13. That is, in the embodiment of FIG. 13, 15 numbers are allocated to the subpixels and the numbers allocated to the subpixels are 1 to 15. And the number's turn is the same as the number. A number 3's turn is 3 and a number 5's turn is 5.

FIG. 13 shows arrangement of view images to be displayed at subpixels if the edge 1302 of the non-transparent area is inclined to the left by an angle acrtan(4/9) with respect to the vertical axis 1301 of the display panel 110. FIG. 13 shows arrangement of the view images to be displayed at subpixels if the seventh number is set to 3 and the eighth number of set to 4 and FIG. 11 shows the numbers allocated to the subpixels if the seventh number is set to 3 and the eighth number is set to 4. The seventh number and the eighth number may be determined based on the angle 1305.

Referring to FIG. 13, the controller 130 determines the view images to be displayed at the subpixels, to which the numbers 1 to 8 are allocated, in FIG. 11 as left view images L and determines the view images to be displayed at the subpixels, to which the numbers 9 to 15 are allocated, as right view images R.

Since the number allocated to the subpixel 1311 is 1, the subpixel 1311 displays the left view image L. Since the number allocated to the subpixel 1312 is 13, the subpixel 1312 displays the right view image R. Since the number allocated to the subpixel 1313 is 10, the subpixel 1313 displays the right view image R. Since the number allocated to the subpixel 1321 is 5, the subpixel 1321 displays the left view image L. Since the number allocated to the subpixel 1322 is 2, the subpixel 1322 displays the left view image L. Since the number allocated to the subpixel 1331 is 9, the subpixel 1331 displays the right view image R. Since the number allocated to the subpixel 1325 is 8, the subpixel 1325 displays the left view image L.

Figure 14:
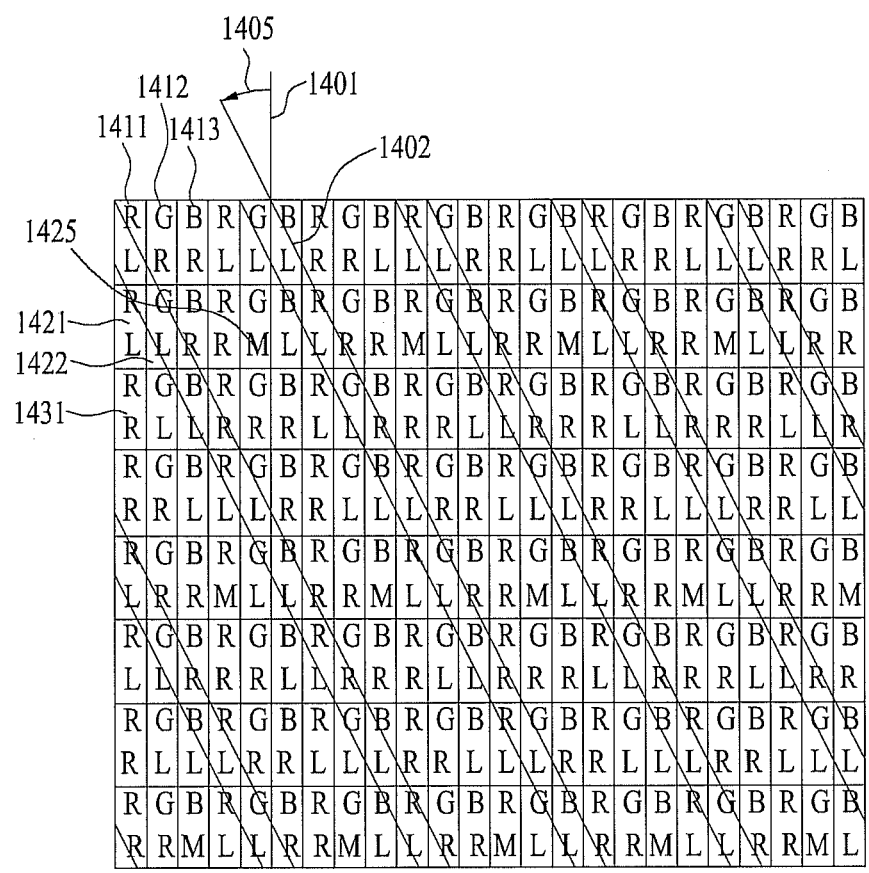
FIG. 14 is a diagram showing arrangement of 2 view images to be displayed at subpixels according to another embodiment of the present invention.

FIG. 14 is a diagram showing arrangement of 2 view images to be displayed at subpixels according to another embodiment of the present invention.

FIG. 14 shows an embodiment in which first to seventh view images are arranged as left view images, an eighth view image is arranged as an image having an average pixel value of the pixel value of the left view image and the pixel value of the right view image, and ninth to fifteenth view images are arranged as right view images in the embodiment of the arrangement of the multiple view images of FIG. 6. In FIG. 14, "L" denotes the left view image, "R" denotes the right view image, and "M" denotes the image having the average pixel value of the pixel value of the left view image and the pixel value of the right view image.

The number shown in the subpixel in FIG. 11 may be the number allocated to the subpixel in the embodiment of FIG. 14. That is, in the embodiment of FIG. 14, 15 numbers are allocated to the subpixels and the numbers allocated to the subpixels are 1 to 15. The number's turn is the same as the number. A number 3's turn is 3 and a number 5's turn is 5.

FIG. 14 shows arrangement of view images to be displayed at subpixels if the edge 1402 of the non-transparent area is inclined to the left by an angle acrtan(4/9) with respect to the vertical axis 1401 of the display panel 110. FIG. 14 shows arrangement of the view images to be displayed at subpixels if the seventh number is set to 3 and the eighth number of set to 4 and FIG. 11 shows the numbers allocated to the subpixels if the seventh number is set to 3 and the eighth number is set to 4. The seventh number and the eighth number may be determined based on the angle 1405.

Referring to FIG. 14, the controller 130 determines the view images to be displayed at the subpixels, to which the numbers 1 to 7 are allocated, in FIG. 11 as left view images L, determines the view image to be displayed at the subpixel, to which the number 8 is allocated, as the image having the average pixel value M of the pixel value of the left view image and the pixel value of the right view image, and determines the view images to be displayed at the subpixels to which the numbers 9 to 15 are allocated, as right view images R.

Since the number allocated to the subpixel 1411 is 1, the subpixel 1411 displays the left view image L. Since the number allocated to the subpixel 1412 is 13, the subpixel 1412 displays the right view image R. Since the number allocated to the subpixel 1413 is 10, the subpixel 1413 displays the right view image R. Since the number allocated to the subpixel 1421 is 5, the subpixel 1421 displays the left view image L. Since the number allocated to the subpixel 1422 is 2, the subpixel 1422 displays the left view image L. Since the number allocated to the subpixel 1431 is 9, the subpixel 1431 displays the right view image R. Since the number allocated to the subpixel 1425 is 8, the subpixel 1425 displays the image having the average pixel value M of the pixel value of the left view image and the pixel value of the right view image.

In some embodiments, in the embodiments of FIGS. 12 to 14, the controller 130 may determine the view images to be displayed at the subpixels based on the numbers allocated to the subpixels of the display panel 110 such that the left view images and the right view images are exchanged with each other. The controller 130 may determine the subpixels, to which the numbers 1 to 7 are allocated, in FIG. 11 as the right view images R and determine the subpixels, to which the numbers 8 to 15 are allocated, as the left view images L. Alternatively, the controller 130 may determine the subpixels, to which the numbers 1 to 8 are allocated, in FIG. 11 as the right view images R and determine the subpixels, to which the numbers 9 to 15 are allocated, as the left view images L. As another example, the controller 130 may determine the subpixels, to which the numbers 1 to 7 are allocated, in FIG. 11 as the right view images R, determine the subpixel, to which the number 8 is allocated, as the image having the average pixel value M of the pixel value of the left view image and the pixel value of the right view image, and determine the subpixels, to which the numbers 9 to 15 are allocated, as the left view images L.

Figure 15:
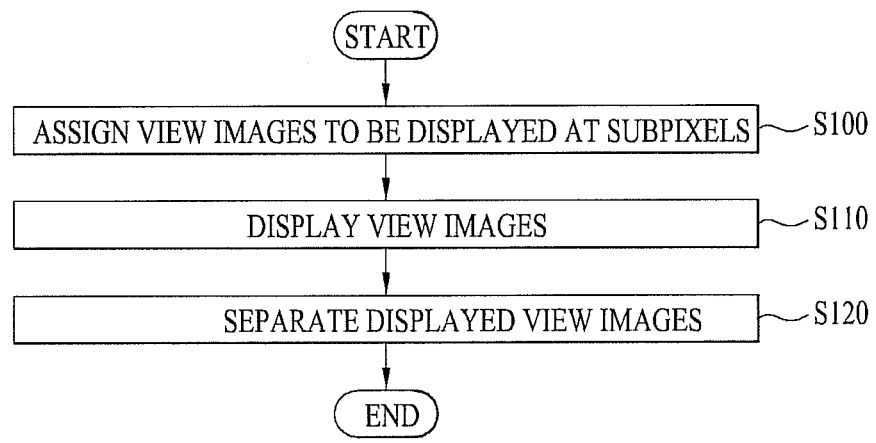
FIG. 15 is a flowchart illustrating a method of displaying a 3D image according to an exemplary embodiment of the present invention.

FIG. 15 is a flowchart illustrating a method of displaying a 3D image according to an exemplary embodiment of the present invention.

Referring to FIG. 15, the controller 130 assigns a view image to be displayed at a subpixel of the display panel 110 (S100). Here, the controller 130 may check an inclination direction or an inclination angle of the edge defining the width of the non-transparent area of the 3D image filter 120 with respect to the vertical axis of the display panel 110. In addition, the controller 130 may check the number of view images included in the 3D image to be displayed. The controller 130 may assign the view image to be displayed at the subpixel according to at least one of the inclination direction or the inclination direction and the number of view images.

If the edge is inclined to the right with respect to the vertical axis of the display panel 110, the controller 130 may assign the view image to be displayed at the subpixel using the method described with reference to FIG. 6. If the edge is inclined to the left with respect to the vertical axis of the display panel 110, the controller 130 may assign the view image to be displayed at the subpixel using the method described with reference to FIG. 11.

If the edge is inclined to the right with respect to the vertical axis of the display panel 110, the numbers allocated to the subpixels may be determined according to the arrangement shown in FIG. 6. If the edge is inclined to the left with respect to the vertical axis of the display panel 110, the numbers allocated to the subpixels may be determined according to the arrangement shown in FIG. 11. The controller 130 may calculate the numbers allocated to the subpixels based on at least one of the information stored in the memory 150, the inclination direction of the edge and the detected information.

In step S100, the controller 130 may determine the view image to be displayed at the subpixel of the display panel 110 to one of two view images based on the numbers allocated to the subpixels of the display panel 110. The controller 130 may determine the view image to be displayed at the subpixel using the methods described with reference to FIGS. 7 to 9 and 12 to 14.

The display panel 110 displays the view images (S110). Here, the subpixels of the display panel 110 display subpixel values indicated by the positions and kinds of the subpixels at the view images assigned in step S100. The backlight 140 may supply light to the display panel 110.

The 3D image filter 120 separates light passing through the display panel 110 (S120). The light separated by the 3D image filter 120 is moved to a sweet spot along the path described with reference to FIG. 3 or 4.

Figure 16:
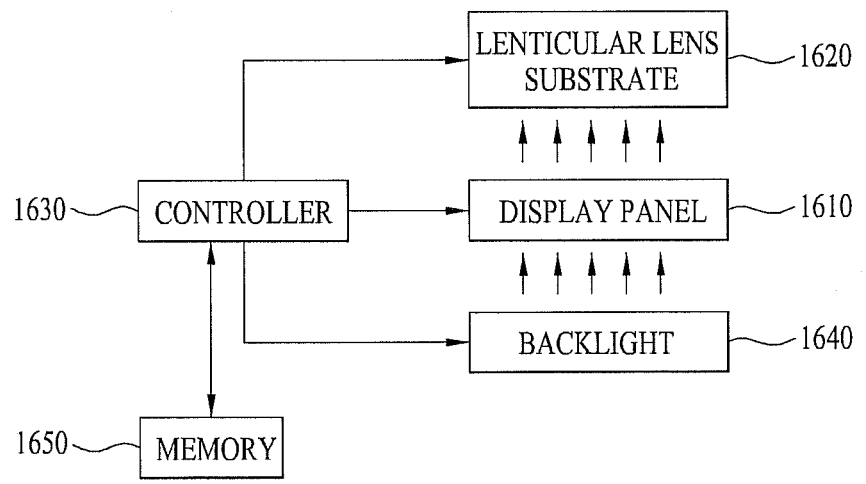
FIG. 16 is a block diagram showing the configuration of an apparatus for displaying a 3D image according to another embodiment of the present invention.

FIG. 16 is a block diagram showing the configuration of an apparatus for displaying a 3D image according to another embodiment of the present invention.

Referring to FIG. 16, the 3D image display apparatus 100 according to the present invention may include a display panel 1610, a lenticular lens substrate 1620, a controller 1630 and a backlight 1640.

The display panel 1610 and the backlight 1640 respectively correspond to the display panel 110 and the backlight 140 shown in FIG. 1. For the display panel 1610 and the backlight 1640, refer to the description of the display panel 110 and the backlight 140.

The lenticular lens substrate 1620 may include a plurality of lenses. The lenses may refract light received from the display panel 1610 such that a viewer views a multi-view image displayed on the display panel 1610 as a 3D image. The lenses may be moved under the control of the controller 1630. At this time, the lenticular lens substrate 1620 may be fixed. One lens included in the lenticular lens substrate 1620 may be called pitch.

Figure 17:
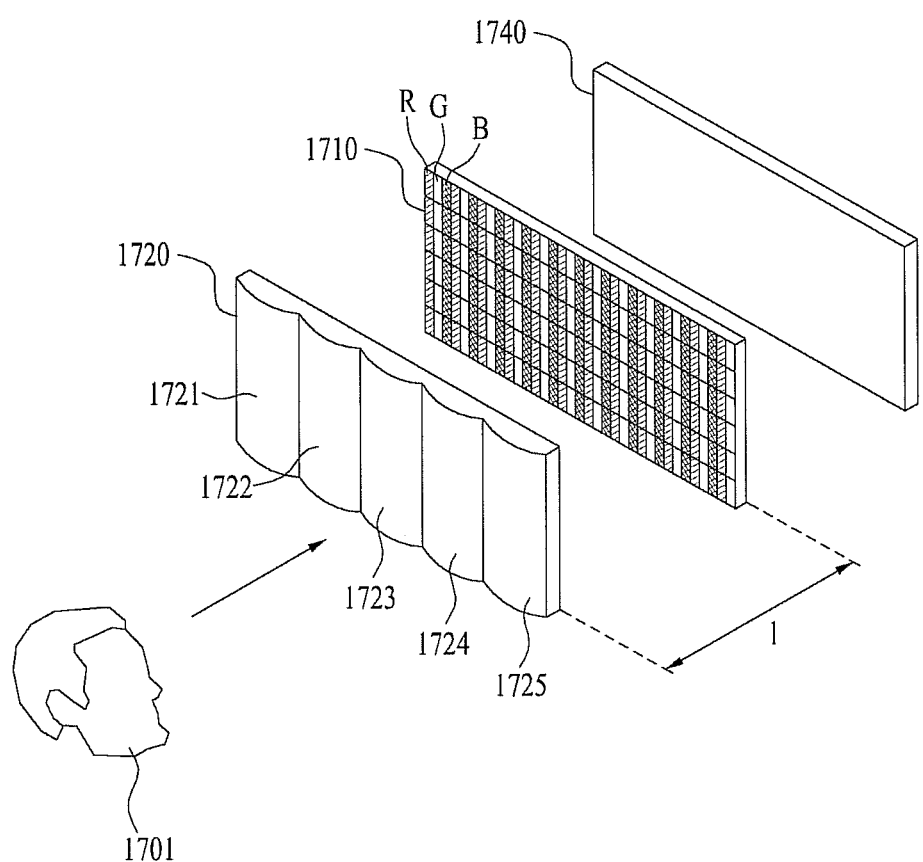
FIG. 17 is a diagram showing arrangement of the apparatus for displaying the 3D image of FIG. 16.

FIG. 17 is a diagram showing arrangement of the apparatus for displaying the 3D image of FIG. 16.

Referring to FIG. 17, the lenticular lens substrate 1720 may be disposed ahead of the display panel 1710. The display panel may be disposed ahead of a backlight 1740. At this time, the lenticular lens substrate 1720 may be disposed to be spaced apart from the display panel 1710 by a predetermined distance I such that an image is placed on a focal surface of the lenticular lens.

The lenticular lens substrate 1720 may be a liquid crystal lenticular filter. In this case, a lens 1721, a lens 1722, a lens 1723, a lens 1724 and a lens 1725 included in the lenticular lens substrate 1720 may be liquid crystal lenses.

Figure 18:
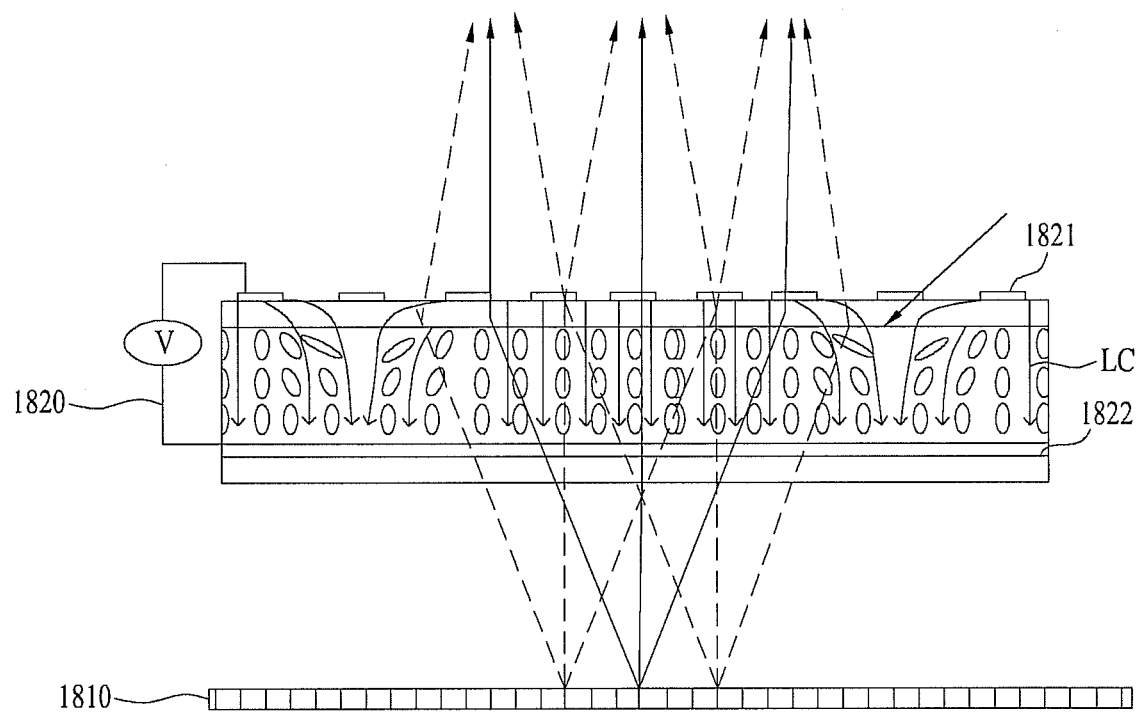
FIG. 18 is a diagram showing a liquid crystal lenticular principle.

FIG. 18 is a diagram showing a liquid crystal lenticular principle.

Referring to FIG. 18, a liquid crystal lenticular filter 1820 may include transparent electrodes (ITO) 1821 and 1822 and liquid crystal LC interposed between the transparent electrodes. The liquid crystal lenticular filter 1820 adjusts refraction of light emitted from the display panel 1810 through the liquid crystal LC such that view images are located at appropriate sweet spots. That is, the liquid crystal LC forms lenses which refract light. The liquid crystal lenticular filter 1820 may adjust a voltage applied to the transparent electrodes (ITO) so as to adjust the position, direction and arrangement of the liquid crystal LC. The positions of the lenses formed may be changed according to the position, direction and arrangement of the liquid crystal LC and thus the sweet spots may be changed.

The liquid crystal lenticular filter 1820 may have a predetermined number of unit electrodes obtained by dividing an electrode included in the lens, and may apply a voltage corresponding to the shape of a lens to be formed to each of the unit electrodes so as to change a refractive index of the liquid crystal, thereby forming the lens.

The liquid crystal lenticular filter 1820 may adjust the voltage applied to each unit electrode so as to move the lens. That is, the liquid crystal lenticular filter 1820 applies the voltage to each unit electrode in order to form the lens to each unit electrode moved by the number of unit electrodes having a length corresponding to a desired movement distance so as to form a unit lens at a position where the unit lens is moved by the desired movement distance.

The liquid crystal lenticular filter 1820 may activate and deactivate the liquid crystal LC. If the liquid crystal is activated, a plurality of lenses is formed and, if the liquid crystal is deactivated, the liquid crystal lenticular filter 1820 does not refract but transmits incident light.

The controller 1630 may control activation and deactivation of the liquid crystal LC of the liquid crystal lenticular filter 1820. The controller 1630 may control deactivation of the liquid crystal LC of the liquid crystal lenticular filter 1820 if a 2D image is displayed. The controller 1630 may control activation of the liquid crystal LC of the liquid crystal lenticular filter 1820 if a 3D image is displayed.

Figure 19:
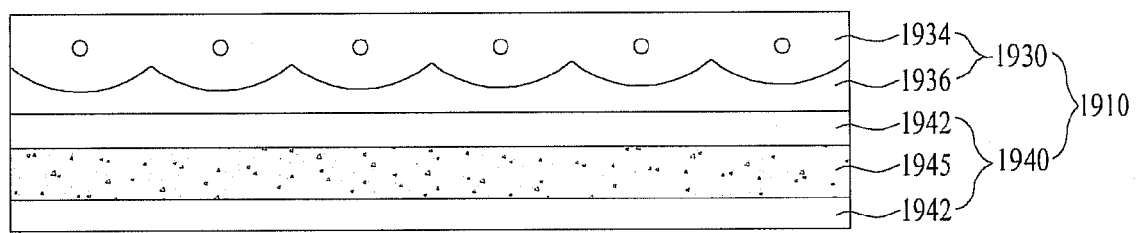
FIG. 19 is a diagram showing the structure of a lenticular lens substrate according to an exemplary embodiment of the present invention.

FIG. 19 is a diagram showing the structure of a lenticular lens substrate according to an exemplary embodiment of the present invention.

FIG. 19 is a cross-sectional diagram illustrating the structure of the lenticular lens substrate according to the exemplary embodiment of the present invention. Referring to FIG. 19, the lenticular lens substrate 1910 may be disposed ahead of the display panel 1610, behind the display panel 1610, or between the display panel 1610 and the backlight 1640.

The lenticular lens substrate 1910 may include a lenticular lens 1930 which selectively refracts light supplied from the display panel 1610 and a lenticular array 1940 which determines a refractive index of the lenticular lens 1930 according to the polarization state of light.

The lenticular lens 1930 includes a concave isotropic layer 1934 and an anisotropic layer 1936. The isotropic layer 1934 may be convex according to designer's intention.

The lenticular array 1940 may include two substrates 1942 and a liquid crystal layer 1945 interposed between the two substrates 1942. Although not limited, a liquid crystal mode such as a Twisted Nematic (TN) mode or Vertical Align (VA) mode in which liquid crystal vertically rotates, an In-Plane Switching (IPS) in which liquid crystal horizontally rotates, or a Ferroelectric Liquid Crystal (FLC) is applicable to the liquid crystal layer 1945.

In the TN or VA mode in which liquid crystal vertically rotates, an elliptically polarized component among polarized components of light is present in the liquid crystal layer. The path of light of the elliptically polarized component is not changed according to the lenticular lens 1930. Thus, the IPS or FLC mode in which liquid crystal horizontally rotates is preferably applied to the lenticular lens 1930.

Figure 20:
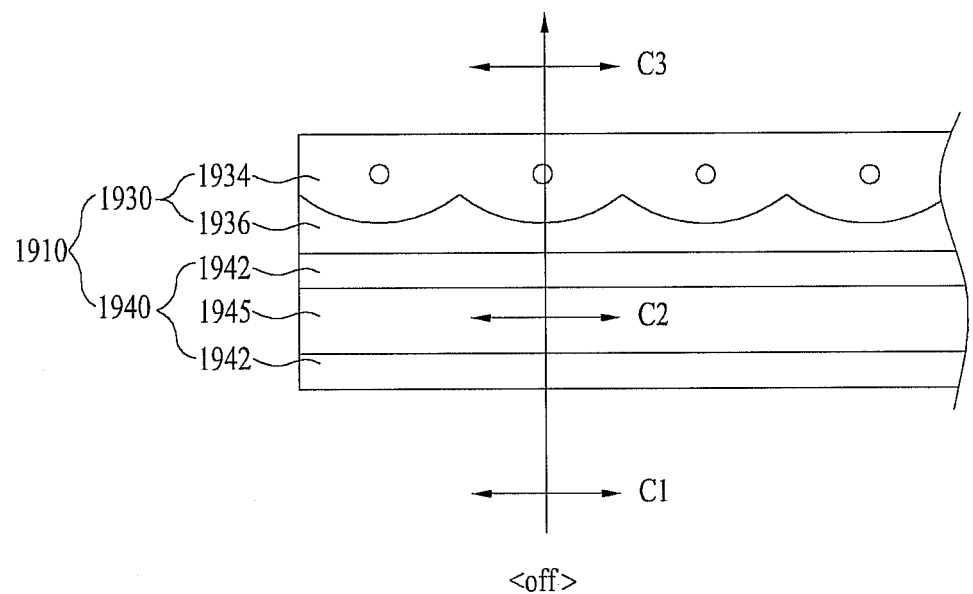
FIG. 20 is a diagram showing a light path adjusted according to a polarization state of light input to the lenticular lens substrate of FIG. 19.
Figure 20:
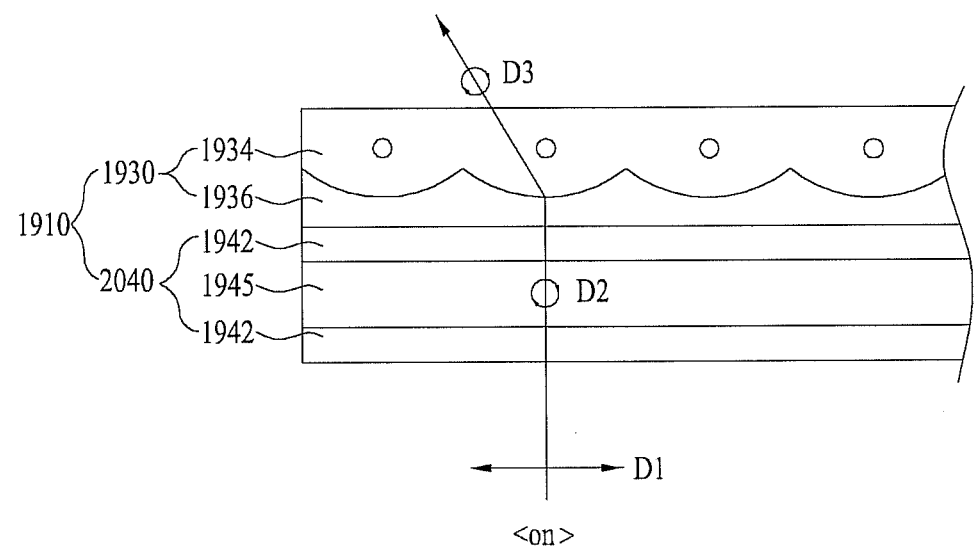

FIG. 20 is a diagram showing a light path adjusted according to a polarization state of light input to the lenticular lens substrate of FIG. 19.

Referring to FIG. 20, if a 2D image is displayed, the controller 1630 controls power-off between two substrates 1942. Thus, an electric field is not formed between the two substrates 1942 and a refractive index of the liquid crystal layer 1945 is not changed.

Accordingly, linearly polarized light C1 received from the display panel 1610 passes through the liquid crystal layer 1945 to enter the lenticular lens 1930. Light C2 passing through the liquid crystal layer 1945 passes through the isotropic layer 1934 and the anisotropic layer 1936 of the lenticular lens 1930. Light C3 passing through the lenticular lens 1930 enters the left eye and right eye of the viewer 1701. The viewer 1701 perceives the 2D image through light C3.

If a 3D image is displayed, the controller 1630 may control power-on between the two substrates 1942. An electric field is formed between the two substrates 1942 and a refractive index of the liquid crystal layer 1945 is changed.

Accordingly, linearly polarized light D1 received from the display panel 1610 is converted into circularly polarized light by passing through the liquid crystal layer 1945 and is input to the lenticular lens 1930. The circularly polarized light D2 passing through the liquid crystal layer 1945 is input to the anisotropic layer 1936 of the lenticular lens 1930 without state change, but is refracted at a predetermined angle at an interface between the isotropic layer 1934 and the anisotropic layer 1936 according to the circularly polarized state, thereby changing a light path. Light D3, the path of which is changed, is moved to a sweet spot and input to the left eye and right eye of the viewer 1701. The viewer 1701 perceives a 3D image through the view image input to the left eye and the view image input to the right eye.

Figure 21:
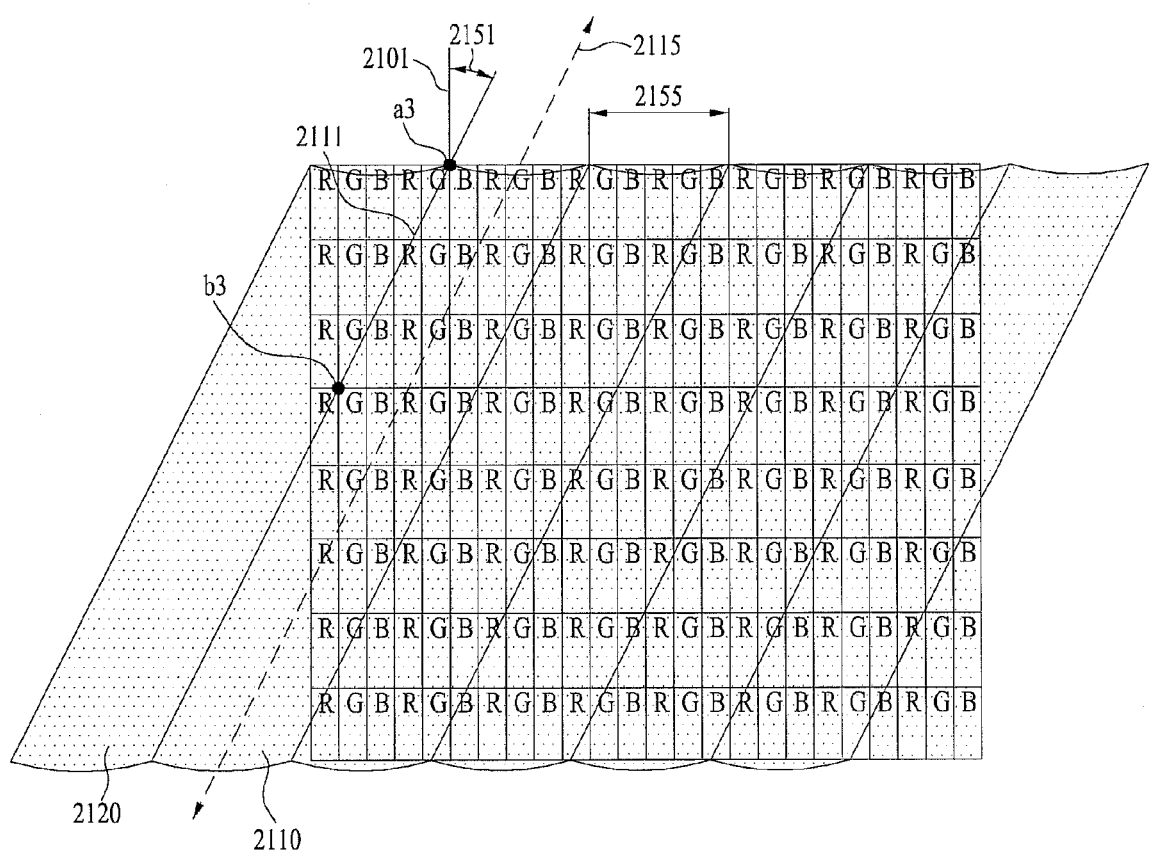
FIG. 21 is a diagram showing a lenticular lens substrate, in which a lens is inclined, according to an exemplary embodiment of the present invention.

FIG. 21 is a diagram showing a lenticular lens substrate, in which a lens is inclined, according to an exemplary embodiment of the present invention.

Referring to FIG. 21, the width of the lenticular lens substrate 1620 may be equal to the total width of 5 subpixels. That is, the pitch of the lenticular lens substrate 1620 may be 5 subpixels. For example, the width of the lens 2110 and the lens 2120 correspond to the total width 2155 of 5 subpixels.

An edge defining the width of the lens may be inclined with respect to a vertical axis 2101 of the display panel. For example, an edge 2111 of the lens 2110 is inclined with respect to the vertical axis 2101 of the display panel.

The vertical axis of the lens may be inclined with respect to the vertical axis 2101. For example, the vertical axis 2115 of the lens 2110 may be inclined with respect to the vertical axis 2101 of the display panel.

The edge of the lens may be formed to pass through a point spaced apart from a start point to the left side of the start point by the width of the lens and spaced apart from the start point by the total length of a predetermined number of subpixels in the column direction. The predetermined number of subpixels may be three subpixels. That is, the edge of the lens may be formed to pass through a point b3 spaced apart from a start point a3 to the left side of the start point a3 by the width of the lens and spaced apart from the start point a3 by the total length of three subpixels in the column direction.

An inclination angle α 2151 of the edge or vertical axis of the lens may be arctan($4P_h/3P_v$). Here, $P_h$ denotes the width of the subpixel and $P_v$ denotes the length of the subpixel. For example, if $P_v$ is three times $P_h$, the angle α may be arctan (4/9).

The edge of the lens may be inclined to the right or left with respect to the vertical axis 2101 of the display panel. FIG. 21 shows the lenticular lens substrate 1620 in which the edge 2111 of the lens is inclined with respect to the vertical axis 2101 of the display panel 1610.

The controller 1630 determines view images which will be displayed at the subpixels of the display panel 1610. The controller 1630 may determine the view images which will be displayed at the subpixels of the display panel 1610, according to at least one of the inclination direction of the edge of the lens and the number of view images.

If the edge or the vertical axis of the lens is inclined to the right, the controller 1630 may determine a view image having an allocation number greater than that of a view image of a previous subpixel in the row direction by a first number, as a view image to be displayed at a subpixel. If the view image having the allocation number greater than that of the view image of the previous subpixel by the first number is not present, the controller 1630 may determine a view image having an allocation number having a difference between the allocation number of the view image, which is greater than that of the view image of the previous subpixel by the first number, and a maximum allocation number, as a view image to be displayed at a subpixel. If the edge or vertical axis of the lens is inclined to the right, the controller 1630 may determine a view image having an allocation number greater than that of a view image of a previous subpixel in the column direction by a second number, as a view image to be displayed at a subpixel. If the view image having the allocation number greater than that of the view image of the previous subpixel by the second number is not present, the controller 1630 may determine a view image having an allocation number having a difference between the allocation number of the view image, which is greater than that of the view image of the previous subpixel by the second number, and a maximum allocation number, as a view image to be displayed at a subpixel. The first number and the second number may be determined based on at least one of the inclination angle of the edge or vertical axis of the lens and the number of view images.

If the edge or vertical axis of the lens is inclined to the right with respect to the vertical axis 2101 of the display panel 1610 by an angle arctan(4/9) and the 3D image display apparatus displays 15 view images respectively having allocation numbers 1 to 15, the controller 1630 may control the same arrangement of view images as arrangement described with reference to FIG. 6. The first number and the second number may be determined based on the angle 2151. As shown in FIG. 6, the first number may be set to 3 and the second number may be set to 4.

The controller 1610 may determine a view image to be displayed at a subpixel of the display panel 1610 to one of two view images based on the numbers allocated to the subpixels of the display panel 110. Here, one of the two view images may be a left view image and the other of the two view images may be a right view image. Here, the numbers may be allocated to the subpixels of the display panel 1610 or may be calculated based on at least one of information detected by the controller 1630 or the inclination direction of the edge of the non-transparent area. The detected information may be information indicating the positions of the viewer's eyes or information indicating the position of a center point of viewer's eyes. The controller 1630 may calculate the numbers such that the center point of both eyes matches a multi-view center point.

If the edge or vertical axis of the lens is inclined to the right with respect to the vertical axis 2101 of the display panel 1610, the number allocated to the subpixel may be determined to a number greater than the number allocated to a previous subpixel in a row direction by a fifth number. If the number greater than the number allocated to the previous subpixel by the fifth number is not present, the number allocated to the subpixel may be determined to a difference between the number greater than the number allocated to the previous subpixel by the fifth number and a maximum number. The number allocated to the subpixel may be determined to a number greater than the number allocated to a previous subpixel in a column direction by a sixth number. If the number greater than the number allocated to the previous subpixel by the sixth number is not present, the number allocated to the subpixel may be determined to a difference between the number greater than the number allocated to the previous subpixel by the sixth number and a maximum number. The controller 1630 may determine the view image to be displayed at the subpixel, to which the above number is allocated, using the methods described with reference to FIGS. 7 to 9.

The memory 1650 may store information indicating the numbers allocated to the subpixels of the display panel 1610. The controller 1630 may determine the view image to be displayed at the subpixel of the display panel to one of two view images based on the stored information. The controller 1630 may calculate the number allocated to the subpixel based on the stored information and the detected information and determine the view image to be displayed on the display panel 1610 to one of two view images. The detected information may be information indicating the positions of the viewer's eyes or information indicating the position of the center point of the viewer's eyes. The controller 1630 may calculate the numbers such that the center point of both eyes matches a multi-view center point.

Figure 22:
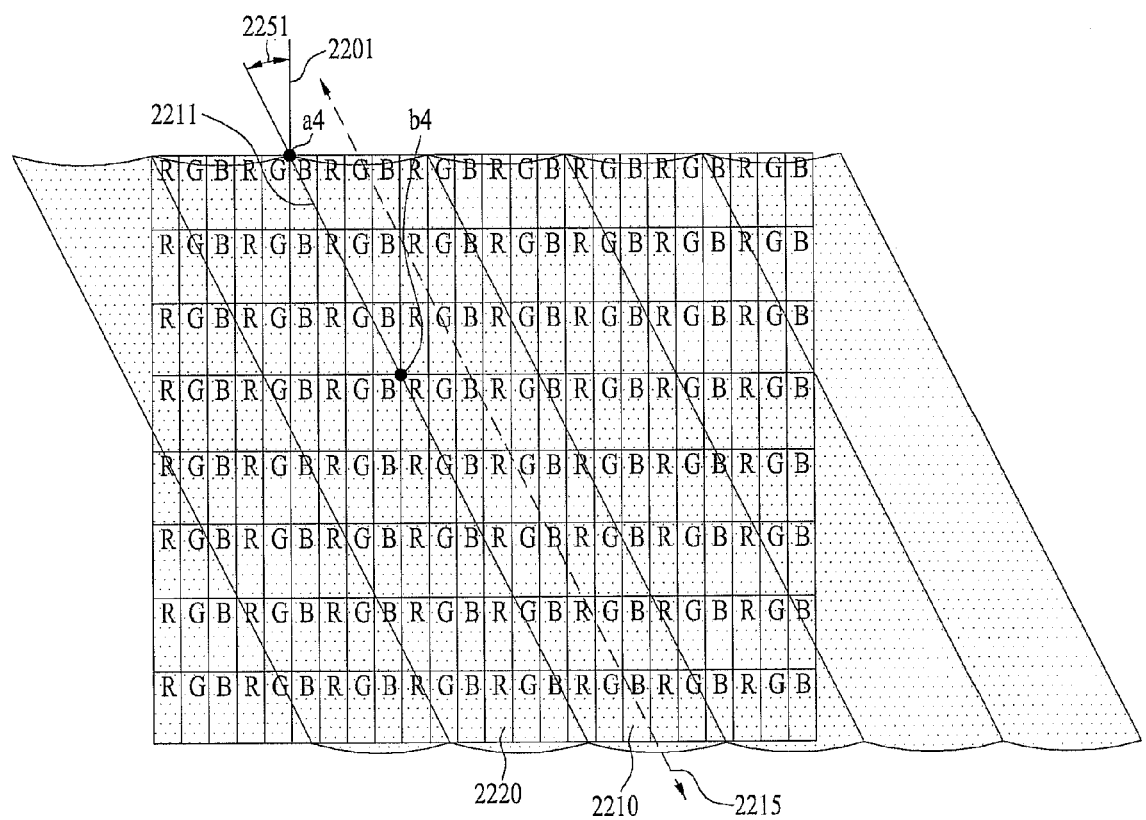
FIG. 22 is a diagram showing a lenticular lens substrate, in which a lens is inclined, according to an exemplary embodiment of the present invention.

FIG. 22 is a diagram showing a lenticular lens substrate, in which a lens is inclined, according to an exemplary embodiment of the present invention.

FIG. 22 shows the lenticular lens substrate 1620 in which the edge or vertical axis of the lens is inclined to the left with respect to the vertical axis of the display.

Referring to FIG. 22, the edge of the lens may be formed to pass through a point spaced apart from a start point to the right side of the start point by the width of the lens and spaced apart from the start point by the total length of a predetermined number of subpixels in the column direction. The predetermined number of subpixels may be three subpixels. That is, the edge 2211 of the lens 2210 may be formed to pass through a point b4 spaced apart from a start point a4 to the right side of the start point a4 by the width of the lens and spaced apart from the start point a4 by the total length of three subpixels in the column direction. The edges of the lens 2210 and the lens 2220 may overlap each other.

An inclination angle α 2251 between the edge 2211 or vertical axis 2215 of the lens and the vertical axis 2201 of the display panel may be arctan(4Ph/3Pv). Here, Ph denotes the width of the subpixel and Pv denotes the length of the subpixel. For example, if Pv is three times Ph, the angle α may be arctan(4/9).

If the edge or vertical axis of the lens is inclined to the left, the controller 1630 may determine a view image having an allocation number less than that of a view image of a previous subpixel in the row direction by a third number, as a view image to be displayed at a subpixel. If the view image having the allocation number less than that of the view image of the previous subpixel by the third number is not present, the controller 1630 may determine a view image having an allocation number having a sum of the allocation number of the view image, which is less than that of the view image of the previous subpixel by the third number, and a maximum allocation number, as a view image to be displayed at a subpixel. If the edge or vertical axis of the lens is inclined to the left, the controller 1630 may determine a view image having an allocation number greater than that of a view image of a previous subpixel in the column direction by a fourth number, as a view image to be displayed at a subpixel. If the view image having the allocation number greater than that of the view image of the previous subpixel by the fourth number is not present, the controller 1630 may determine a view image having an allocation number having a difference between the allocation number of the view image, which is greater than that of the view image of the previous subpixel by the fourth number, and a maximum allocation number, as a view image to be displayed at a subpixel. The third number and the fourth number may be determined based on at least one of the inclination angle of the edge of the lens and the number of view images.

If the edge or vertical axis of the lens is inclined to the left with respect to the vertical axis 2101 of the display panel 1610 by an angle arctan(4/9) and the 3D image display apparatus displays 15 view images respectively having allocation numbers 1 to 15, the controller may control the arrangement of view images as arrangement described with reference to FIG. 11. The third number and the fourth number may be determined based on the angle 2251. As shown in FIG. 11, the third number may be set to 3 and the fourth number may be set to 4.

If the edge or vertical axis of the lens is inclined to the left with respect to the vertical axis 2101 of the display panel 1610, the number allocated to the subpixel may be determined to a number less than the number allocated to a previous subpixel in a row direction by a seventh number. If the number greater than the number allocated to the previous subpixel by the seventh number is not present, the number allocated to the subpixel may be determined to a sum of the number less than the number allocated to the previous subpixel by the seventh number and a maximum number. The number allocated to the subpixel may be determined to a number greater than the number allocated to a previous subpixel in a column direction by an eighth number. If the number greater than the number allocated to the previous subpixel by the eighth number is not present, the number allocated to the subpixel may be determined to a difference between the number greater than the number allocated to the previous subpixel by the eighth number and a maximum number. The controller 1630 may determine the view image to be displayed at the subpixel, to which the above number is allocated, using the methods described with reference to FIGS. 12 to 14.

Figure 23:
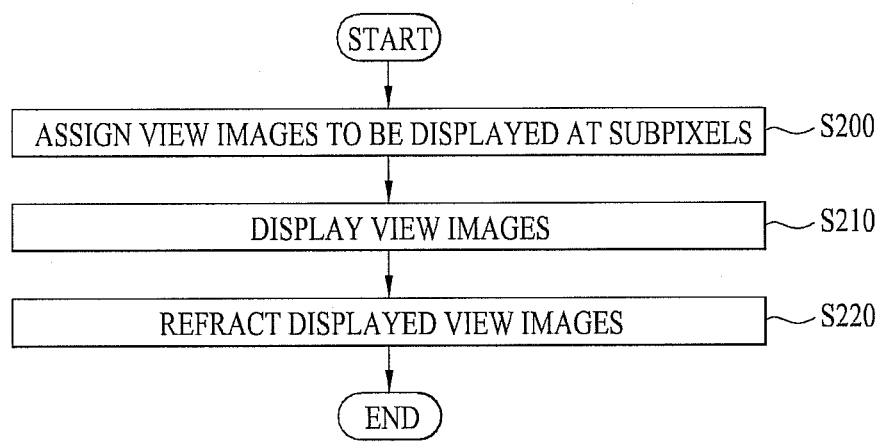
FIG. 23 is a flowchart illustrating a method of displaying a 3D image according to an exemplary embodiment of the present invention.

FIG. 23 is a flowchart illustrating a method of displaying a 3D image according to an exemplary embodiment of the present invention.

Referring to FIG. 23, the controller 1630 assigns a view image to be displayed at a subpixel of the display panel 1610 (S200). Here, the controller 1630 may check an inclination direction or an inclination angle of the edge defining the width of the lens of the lenticular lens substrate 1620 with respect to the vertical axis of the display panel 1610. In addition, the controller 1630 may check the number of view images included in the 3D image to be displayed. The controller 1630 may assign the view image to be displayed at the subpixel according to at least one of the inclination direction or the inclination and the number of view images.

If the edge or the vertical axis of the lens is inclined to the right with respect to the vertical axis of the display panel 1610, the controller 1630 may assign the view image to be displayed at the subpixel using the method described with reference to FIG. 6. If the edge or vertical axis of the lens is inclined to the left with respect to the vertical axis of the display panel 1610, the controller 1630 may assign the view image to be displayed at the subpixel using the method described with reference to FIG. 11.

If the edge or vertical axis of the lens is inclined to the right with respect to the vertical axis of the display panel 1610, the allocation numbers of the subpixels may be determined according to the arrangement shown in FIG. 6. If the edge or vertical axis of the lens is inclined to the left with respect to the vertical axis of the display panel 1610, the allocation numbers of the subpixels may be determined according to the arrangement shown in FIG. 11. The controller 130 may calculate the numbers allocated to the subpixels based on at least one of the information stored in the memory 150, the inclination direction of the edge and the detected information.

In step S200, the controller 1630 may determine the view image to be displayed at the subpixel of the display panel 1610 to one of two view images based on the number allocated to the subpixel of the display panel 1610. The controller 1630 may determine the view image to be displayed at the subpixel using the methods described with reference to FIGS. 7 to 9 and 12 to 14.

The display panel 1610 displays the view images (S210). Here, the subpixels of the display panel 1610 display subpixel values indicated by the positions and kinds of the subpixels at the view images determined in step S200. The backlight 1640 may supply light to the display panel 1610.

The lenticular lens substrate 1620 refracts light passing through the display panel 1610 (S220). The light refracted by the lenticular lens substrate 1620 is moved to a sweet spot according to the principle described with reference to FIG. 18 or 20.

The present invention may be implemented as code that can be written on a computer-readable recording medium and can thus be read by a processor. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed to realize the embodiments herein can be construed by one of ordinary skill in the art.

According to an apparatus and method for displaying a 3D image of the present invention, by suppressing a pattern in which a bright area and a dark area are regularly repeated while displaying the 3D image, it is possible to prevent a moiré phenomenon, minimize vertical resolution deterioration, improve crosstalk due to user motion while viewing the 3D image, and display both a 2-dimensional (2D) image and the 3D image.

Since a 2-view image is displayed using a multi-view method, it is possible to provide a wide sweet spot so as to enlarge a viewing angle of a viewer and remarkably reduce crosstalk and flipping generated while the viewer moves.

Since the position of the image displayed at the subpixel is changed by tracking the position of the user and the display position of the image is changed before the user reaches a point where a view image is changed and viewed, it is possible to prevent crosstalk and flipping from being generated due to viewer motion while viewing a 3D image.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An apparatus for displaying both a perceived three-dimensional (3D) image and a 2-dimensional (2D) image, comprising:
a display panel having a plurality of subpixels, wherein red, green and blue subpixels are alternately arranged in a row direction of the display panel, and subpixels having a same color are arranged in a column direction of the display panel;
a 3D image filter provided in front of the display panel, the 3D image filter including a transparent area and a non-transparent area that are arranged alternately, wherein an edge that defines a width of the non-transparent area is inclined with respect to a vertical axis of the display panel; and
a controller to assign a view image to be displayed at a subpixel of the display panel based on an inclination angle and an inclination direction of the edge with respect to the vertical axis of the display panel, wherein an inclination angle of the edge is arctan (4Ph/3Pv), wherein Ph represents a width of the subpixel and Pv represents a length of the subpixel, and wherein Pv is three times Ph,
wherein the controller controls activation and deactivation of the non-transparent area of the 3D image filter according to a kind of the image to be displayed, and the controller is configured to:
control deactivation of the non-transparent area of the 3D image filter when the displayed image is a 2D image, and
control activation of the non-transparent area of the 3D image filter when the displayed image is a 3D image,
wherein the perceived 3D image is a multi-view image including three or more images acquired by photographing a subject using three or more cameras, and a part of the images less than a number of images included in the multi-view image are displayed in one row of the subpixels, wherein two of the part of the images form a sweet spot for viewing 3D image,
wherein the part of the images is continuously assigned to the subpixels, and wherein the controller assigns the multi-view image in the row direction of the display panel by a first number and assigns the multi-view image in the column direction of the display panel by a second number.

2. The apparatus according to claim 1, wherein a width of the non-transparent area of the 3D image filter corresponds to a total width of four subpixels.

3. The apparatus according to claim 1, wherein a width of the transparent area of the 3D image filter corresponds to a width of one subpixel.

4. The apparatus according to claim 1, wherein the edge of the non-transparent area of the 3D image filter is formed to pass through a point spaced apart from a start point by the width of the non transparent area in the row direction of the display panel and is spaced apart from the start point by a total length of a predetermined number of subpixels in the column direction of the display panel.

5. The apparatus according to claim 1, wherein the controller controls activation and deactivation of the non-transparent area of the 3D image filter based on a type of the displayed image.

6. The apparatus according to claim 1, further comprising a backlight behind the display panel, the backlight to supply light to the display panel.

7. The apparatus according to claim 1, wherein the display panel is a Plasma Display Panel (PDP) or a Liquid Crystal Display (LCD).

8. The apparatus according to claim 1, wherein the perceived 3D image includes 15 view images.

9. The apparatus according to claim 1, wherein the first number and the second number are 3 or more.

10. The apparatus according to claim 1, wherein, when the edge is inclined to the right with respect to the vertical axis of the display panel, the controller:
as a view image to be displayed at a subpixel,
assigns a view image having an allocation number greater than that of a view image of a previous subpixel in the row direction by the first number and assigns a view image having an allocation number having a difference between the allocation number of the view image, which is greater than that of the view image of the previous subpixel by the first number, and a maximum allocation number when the view image having the allocation number greater than that of the view image of the previous subpixel by the first number is not present, and
assigns a view image having an allocation number greater than that of a view image of a previous subpixel in the column direction by the second number and assigns a view image having an allocation number having a difference between the allocation number of the view image, which is greater than that of the view image of the previous subpixel by the second number, and a maximum allocation number when the view image having the allocation number greater than that of the view image of the previous subpixel by the second number is not present.

11. The apparatus according to claim 1, wherein, when the edge is inclined to the left with respect to the vertical axis of the display panel, the controller:
as a view image to be displayed at a subpixel,
assigns a view image having an allocation number less than that of a view image of a previous subpixel in the row direction by the first number and assigns a view image having an allocation number having a sum of the allocation number of the view image, which is less than that of the view image of the previous subpixel by the first number, and a maximum allocation number when the view image having the allocation number less than that of the view image of the previous subpixel by the first number is not present, and
assigns a view image having an allocation number greater than that of a view image of a previous subpixel in the column direction by the second number and assigns a view image having an allocation number having a difference between the allocation number of the view image, which is greater than that of the view image of the previous subpixel by the second number, and a maximum allocation number when the view image having the allocation number greater than that of the view image of the previous subpixel by the second number is not present.

12. An apparatus for displaying both a perceived three-dimensional (3D) image and a 2-dimensional (2D) image, comprising:

a display panel having a plurality of subpixels, wherein red, green and blue subpixels are alternately arranged in a row direction of the display panel, and subpixels having a same color are arranged in a column direction of the display panel;

a lenticular lens substrate provided in front of the display panel, the lenticular lens substrate including a plurality of lenses, wherein a vertical axis of each lens is inclined with respect to a vertical axis of the display panel; and a controller to assign a view image to be displayed at a subpixel of the display panel based on an inclination angle and an inclination direction of the vertical axis of the lens with respect to the vertical axis of the display panel, wherein an inclination angle of the edge is arctan (4Ph/3Pv), wherein Ph represents a width of the subpixel and Pv represents a length of the subpixel, and wherein Pv is three times Ph, and wherein the controller controls activation and deactivation of a non-transparent area of a 3D image filter according to a kind of the image to be displayed, and the controller is configured to:

control deactivation of the non-transparent area of the 3D image filter when the displayed image is a 2D image, and control activation of the non-transparent area of the 3D image filter when the displayed image is a 3D image, wherein the perceived 3D image is a multi-view image including three or more images acquired by photographing a subject using three or more cameras, and a part of the images less than a number of images included in the multi-view image are displayed in one row of the subpixels, wherein two of the part of the images form a sweet spot for viewing 3D image, wherein the part of the images is continuously assigned to the subpixels, and wherein the controller assigns the multi-view image in the row direction of the display panel by a first number and assigns the multi-view image in the column direction of the display panel by a second number.

13. The apparatus according to claim 12, wherein a width of the lens corresponds to a total width of 5 subpixels.

14. The apparatus according to claim 12, wherein an inclination angle α of the vertical axis of the lens is arctan (4Ph/3Pv), wherein Ph represents a width of the subpixel and Pv represents a length of the subpixel.

15. The apparatus according to claim 12, wherein:

the lenticular lens substrate further includes a lenticular array to convert transmitted light into circularly polarized light, and the controller controls activation and deactivation of the lenticular array based on a type of the displayed image.

16. The apparatus according to claim 12, further comprising a backlight behind the display panel, the backlight to supply light to the display panel.

17. The apparatus according to claim 12, wherein the display panel is a Plasma Display Panel (PDP) or a Liquid Crystal Display (LCD).

18. The apparatus according to claim 12, wherein the multi-image view includes 15 view images.

19. The apparatus according to claim 12, wherein the first number and the second number are 3 or more.

20. The apparatus according to claim 12, wherein, when the vertical axis of the lens is inclined to the right with respect to the vertical axis of the display panel, the controller:

as a view image to be displayed at a subpixel, assigns a view image having an allocation number greater than that of a view image of a previous subpixel in the row direction by the first number and assigns a view image having an allocation number having a difference between the allocation number of the view image, which is greater than that of the view image of the previous subpixel by the first number, and a maximum allocation number when the view image having the allocation number greater than that of the view image of the previous subpixel by the first number is not present, and assigns a view image having an allocation number greater than that of a view image of a previous subpixel in the column direction by the second number and assigns a view image having an allocation number having a difference between the allocation number of the view image, which is greater than that of the view image of the previous subpixel by the second number, and a maximum allocation number when the view image having the allocation number greater than that of the view image of the previous subpixel by the second number is not present.

21. The apparatus according to claim 12, wherein, when the vertical axis of the lens is inclined to the left with respect to the vertical axis of the display panel, the controller:

as a view image to be displayed at a subpixel, assigns a view image having an allocation number less than that of a view image of a previous subpixel in the row direction by the first number and assigns a view image having an allocation number having a sum of the allocation number of the view image, which is less than that of the view image of the previous subpixel by the first number, and a maximum allocation number when the view image having the allocation number less than that of the view image of the previous subpixel by the first number is not present, and assigns a view image having an allocation number greater than that of a view image of a previous subpixel in the column direction by the second number and assigns a view image having an allocation number having a difference between the allocation number of the view image, which is greater than that of the view image of the previous subpixel by the second number, and a maximum allocation number when the view image having the allocation number greater than that of the view image of the previous subpixel by the second number is not present.

22. A method of displaying both a perceived three-dimensional (3D) image and 2-dimensional (2D) image on a display panel having a plurality of subpixels, the method comprising:

assigning view images to be displayed at subpixels of the display panel from among a plurality of view images based on an inclination angle and an inclination direction of an edge that defines a width of a non-transparent area of an image filter, wherein an inclination angle of the edge is arctan (4Ph/3Pv), wherein Ph represents a width of the subpixel and Pv represents a length of the subpixel, and wherein Pv is three times Ph;

displaying the assigned view images through the subpixels of the display panel;

controlling deactivation of the non-transparent area of the image filter when the displayed image is a 2D image; and controlling activation of the non-transparent area of the image filter when the displayed image is a 3D image, wherein the edge of the non-transparent area is inclined with respect to a vertical axis of the display panel, and red, green and blue subpixels are alternately arranged in a row direction of the display panel, and subpixels having a same color are arranged in a column direction of the display panel, wherein the perceived 3D image is a multi-view image including three or more images acquired by photographing a subject using three or more cameras, and a part of the images less than a number of images included in the multi-view image are displayed in one row of the subpixels, wherein two of the part of the images form a sweet spot for viewing 3D image, wherein the part of the images is continuously assigned to the subpixels, and wherein assigning view images includes assigning the multi-view image in the row direction of the display panel by a first number and assigning the multi-view image in the column direction of the display panel by a second number, and wherein the first number and the second number are 3 or more.

23. The method according to claim 22, further comprising separating the displayed view images using a transparent area of the image filter formed between non-transparent areas of the image filter.

24. The method according to claim 22, further comprising refracting the displayed view images using a lens.

25. The method according to claim 22, wherein the multi-view image includes 15 view images.

\* \* \* \* \*